(12) United States Patent
D'Amico, III

(10) Patent No.: US 11,939,722 B1
(45) Date of Patent: Mar. 26, 2024

(54) MOVING FLUID IN A ROTATING CYLINDER

(71) Applicant: Joseph V. D'Amico, III, New Orleans, LA (US)

(72) Inventor: Joseph V. D'Amico, III, New Orleans, LA (US)

( * ) Notice: Subject to any disclaimer, the term of this patent is extended or adjusted under 35 U.S.C. 154(b) by 0 days.

(21) Appl. No.: 17/582,840

(22) Filed: Jan. 24, 2022

Related U.S. Application Data

(63) Continuation of application No. 16/098,630, filed as application No. PCT/US2017/030600 on May 2, 2017, now Pat. No. 11,230,809.

(60) Provisional application No. 62/331,246, filed on May 3, 2016.

(51) Int. Cl.
| | |
|---|---|
| *D21F 5/10* | (2006.01) |
| *B23P 17/06* | (2006.01) |
| *F26B 11/06* | (2006.01) |
| *F26B 13/18* | (2006.01) |

(52) U.S. Cl.
CPC ............ *D21F 5/10* (2013.01); *F26B 11/0486* (2013.01); *F26B 13/183* (2013.01); *B23P 17/06* (2013.01)

(58) Field of Classification Search
CPC .......... D21F 5/10; C03B 37/055; B23P 17/06; Y10T 29/14
USPC ........................................ 29/4.52
See application file for complete search history.

(56) References Cited

U.S. PATENT DOCUMENTS

| | | | | |
|---|---|---|---|---|
| 666,477 | A * | 1/1901 | Hunting | D21F 5/10 34/125 |
| 1,116,196 | A * | 11/1914 | Zierden | D21F 5/10 159/11.1 |
| 1,258,055 | A * | 3/1918 | St. Clair | D21F 5/10 34/125 |
| 1,406,991 | A * | 2/1922 | Mackay | D21F 5/10 34/125 |
| 2,882,552 | A * | 4/1959 | Downey | C03B 37/05 65/526 |
| 2,931,062 | A * | 4/1960 | Leaman | C03B 37/045 65/492 |
| 2,944,284 | A * | 7/1960 | Tillotson | B01F 25/74 65/447 |
| 3,054,140 | A * | 9/1962 | Firnhaber | C03B 37/05 65/517 |
| RE25,306 | E * | 12/1962 | Corsentino | C03B 37/05 65/516 |
| 3,304,164 | A * | 2/1967 | Brossard | C03B 37/048 264/165 |

(Continued)

OTHER PUBLICATIONS

PCT Application No. US2017/030600; International Search Report and Written Opinion of the International Searching Authority for Applicant Joseph V. D'Amico III dated Sep. 14, 2017.

*Primary Examiner* — Michael W Hotchkiss

(57) ABSTRACT

The invention may utilize shaft horsepower for rotating cylinders to move a fluid in an axial direction within the cylinder. The cylinder may comprise a spiral blade on or in its inner surface with a pitch relative to a central axis of the cylinder. The blade's pitch may be variable or uniform with respect to the central axis. In some applications, plural blades may be positioned within the cylinder. The invention is particularly suitable for imparting kinetic energy sufficient to assist with the evacuation of condensate from a paper dryer cylinder with reduced or no blow through steam. The invention also has applications for spinner wheels.

18 Claims, 15 Drawing Sheets

(56) References Cited

U.S. PATENT DOCUMENTS

| | | | | |
|---|---|---|---|---|
| 4,140,478 A * | 2/1979 | Kawakami | | F26B 25/006 |
| | | | | 405/128.85 |
| 4,155,177 A * | 5/1979 | Justus | | D21F 5/10 |
| | | | | 34/124 |
| 4,195,417 A * | 4/1980 | Mathews | | D21F 5/021 |
| | | | | 34/119 |
| 4,385,453 A * | 5/1983 | Withers, Jr. | | F26B 13/183 |
| | | | | 34/124 |
| 4,385,454 A * | 5/1983 | Withers | | D21F 5/021 |
| | | | | 411/95 |
| 4,468,931 A * | 9/1984 | Wooding | | C03B 37/055 |
| | | | | 65/517 |
| 4,668,267 A * | 5/1987 | Savary | | C03C 25/12 |
| | | | | 366/156.1 |
| 4,875,842 A * | 10/1989 | Iida | | F04C 18/107 |
| | | | | 418/164 |
| 4,930,199 A * | 6/1990 | Yanagisawa | | B22F 1/062 |
| | | | | 83/913 |
| 5,090,874 A * | 2/1992 | Aikawa | | F04C 29/0057 |
| | | | | 418/220 |
| 5,274,896 A * | 1/1994 | Saltin | | C03B 5/005 |
| | | | | 29/403.1 |
| 5,299,924 A * | 4/1994 | Hirata | | F04C 18/107 |
| | | | | 418/150 |
| 5,335,427 A | 8/1994 | Partio | | |
| 5,601,628 A * | 2/1997 | Battigelli | | C03B 37/045 |
| | | | | 65/461 |
| 5,900,037 A * | 5/1999 | Yang | | C03B 37/048 |
| | | | | 65/459 |
| 7,673,395 B2 | 3/2010 | Timm et al. | | |
| 7,779,653 B2 * | 8/2010 | Borsa | | F16L 59/028 |
| | | | | 65/459 |
| 10,138,156 B2 * | 11/2018 | Chakroun | | C03B 37/048 |

\* cited by examiner

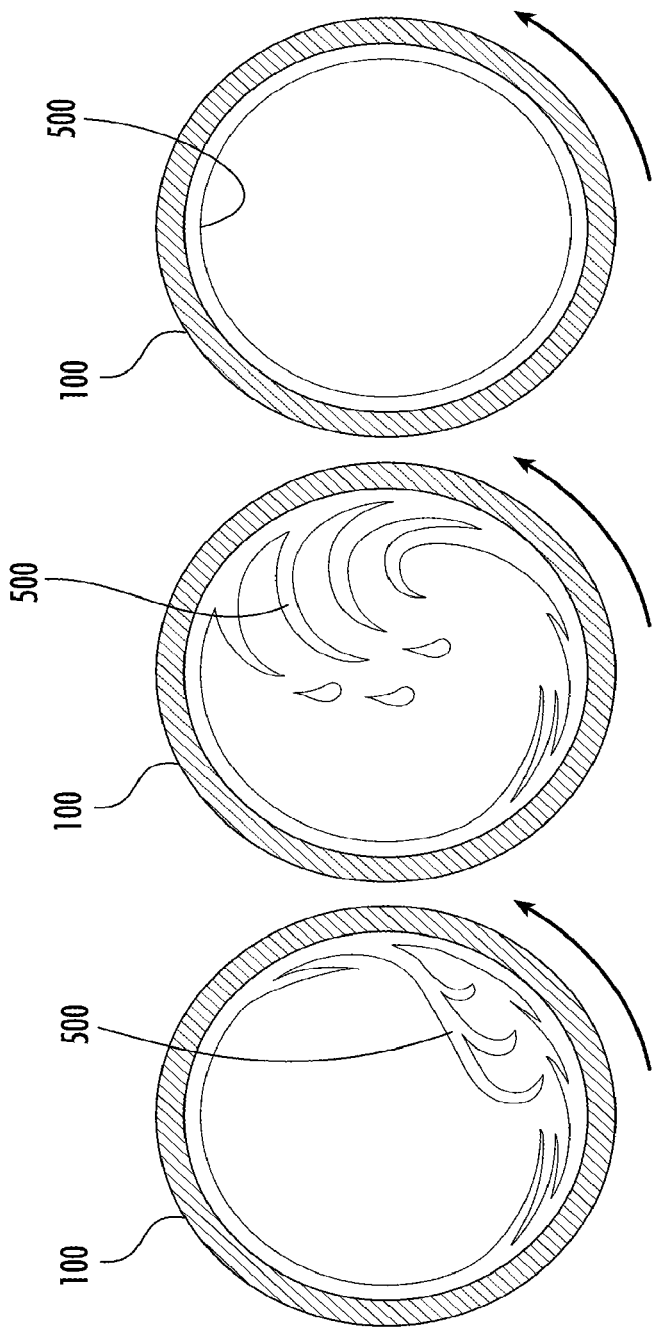

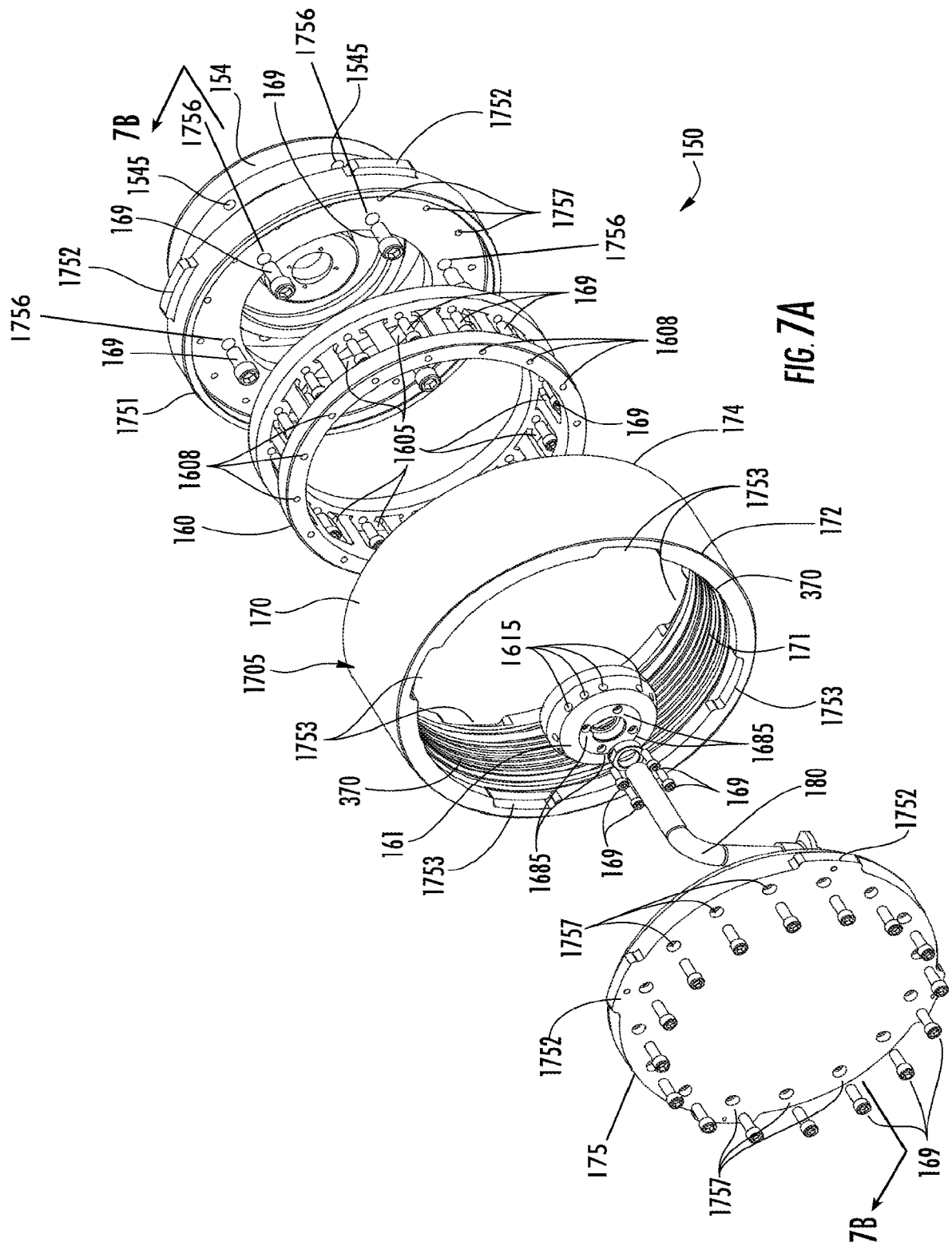

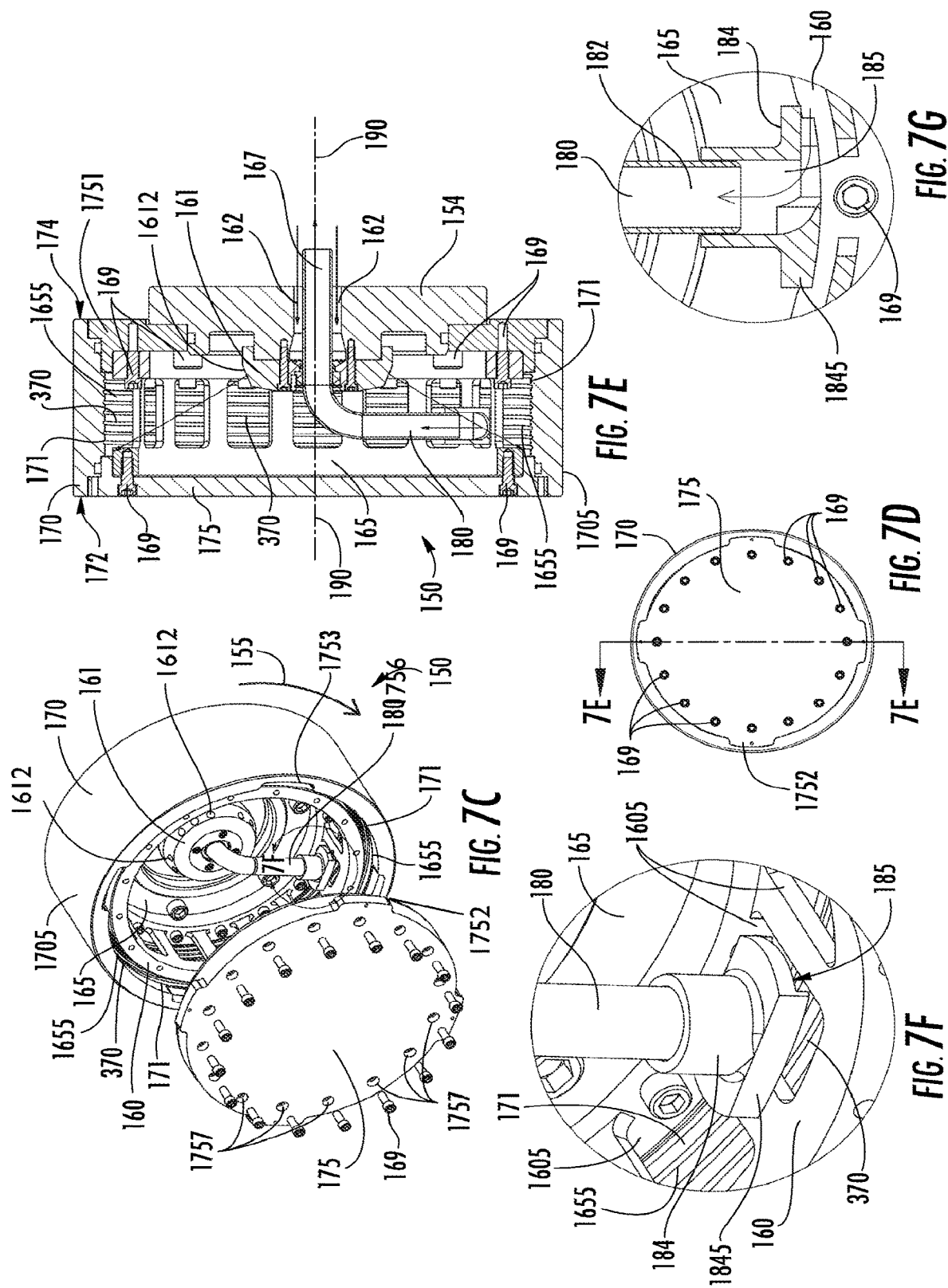

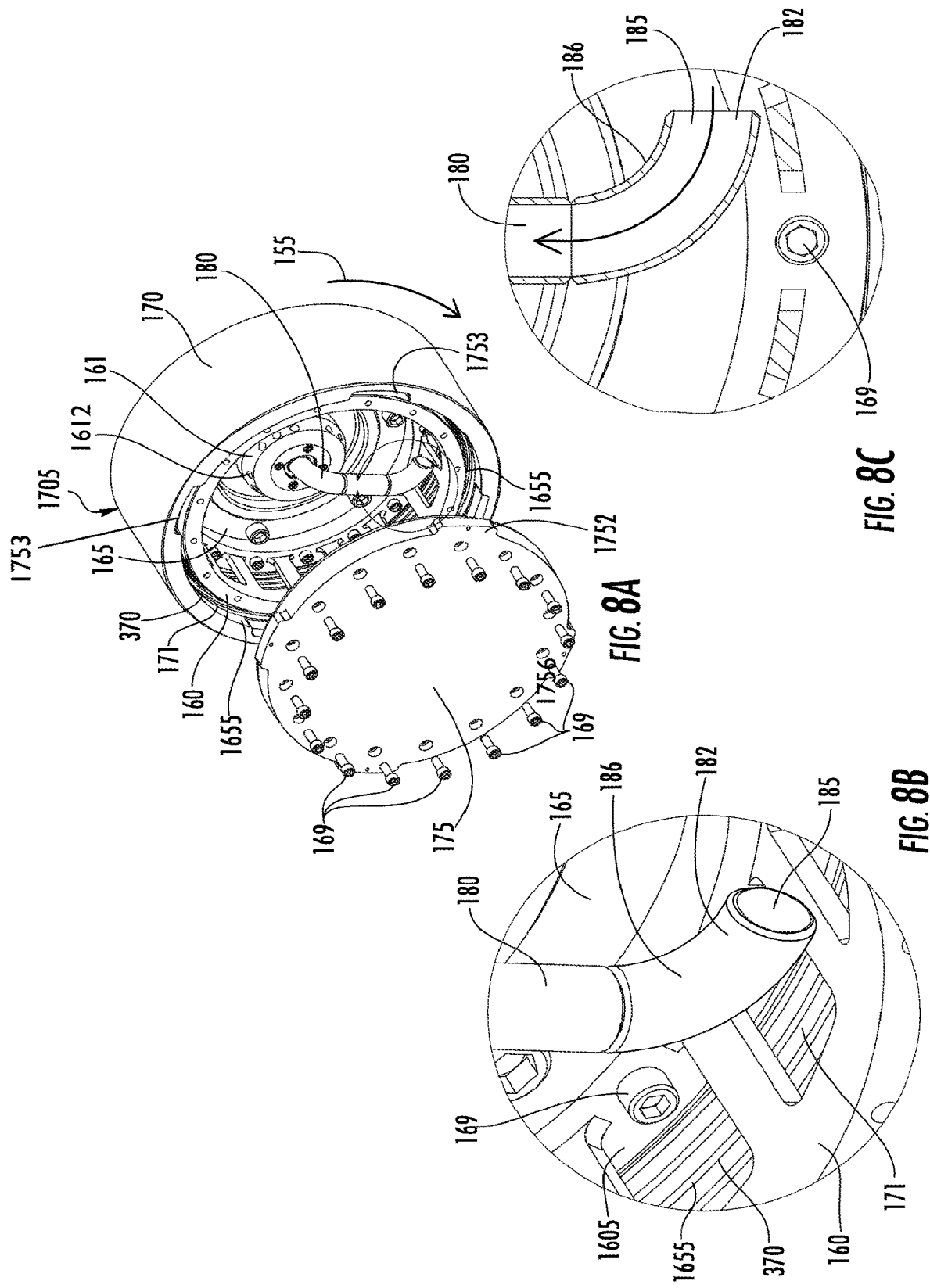

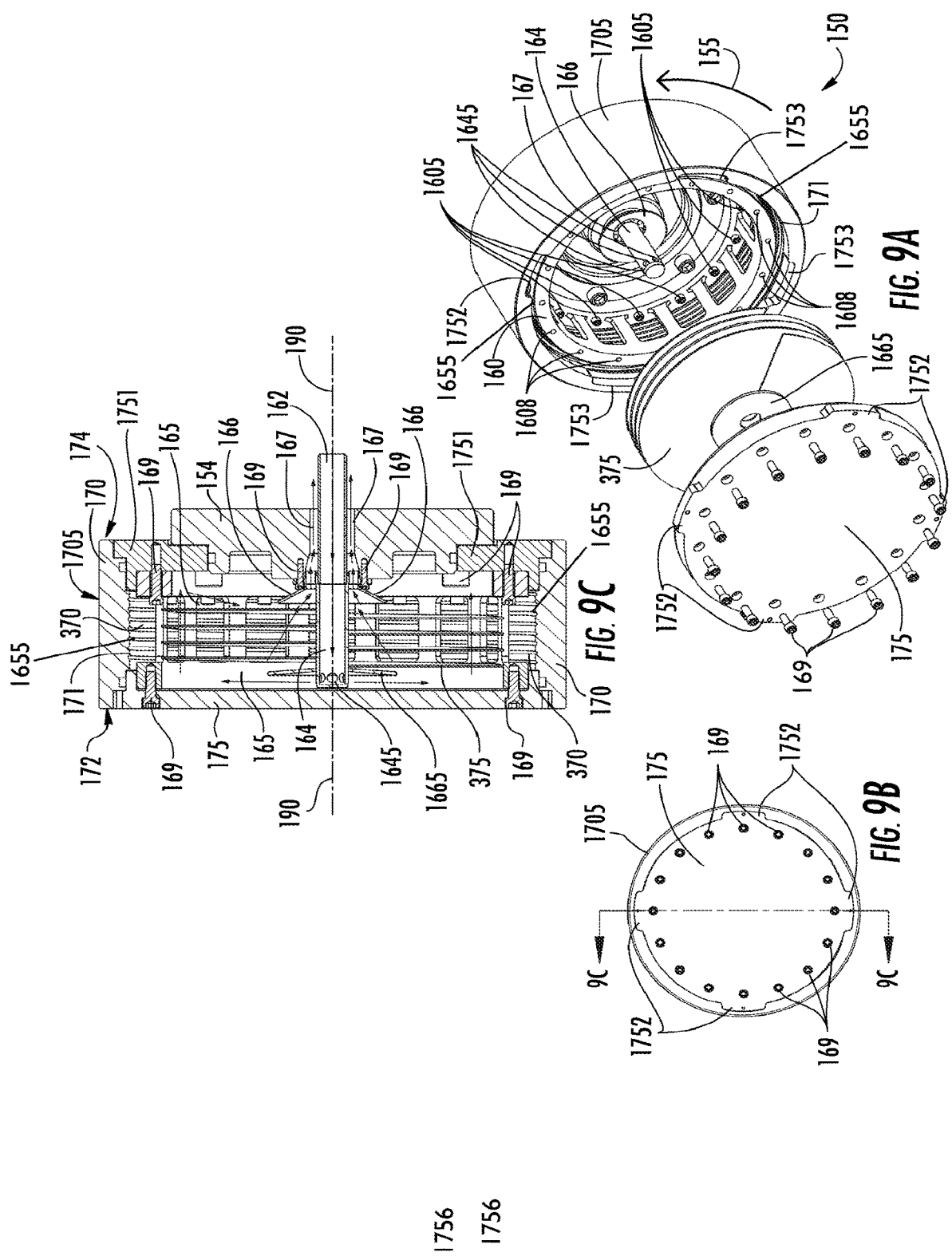

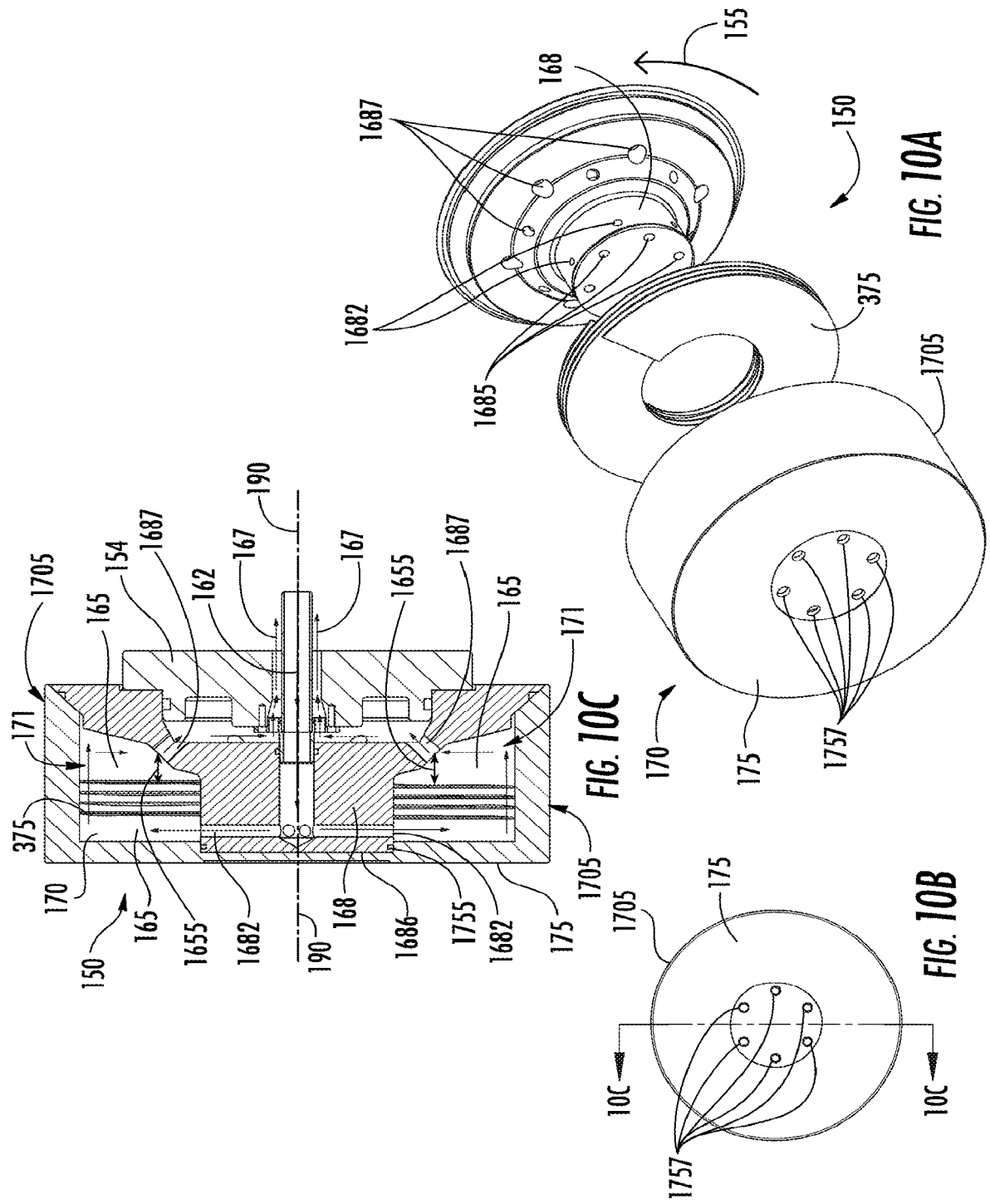

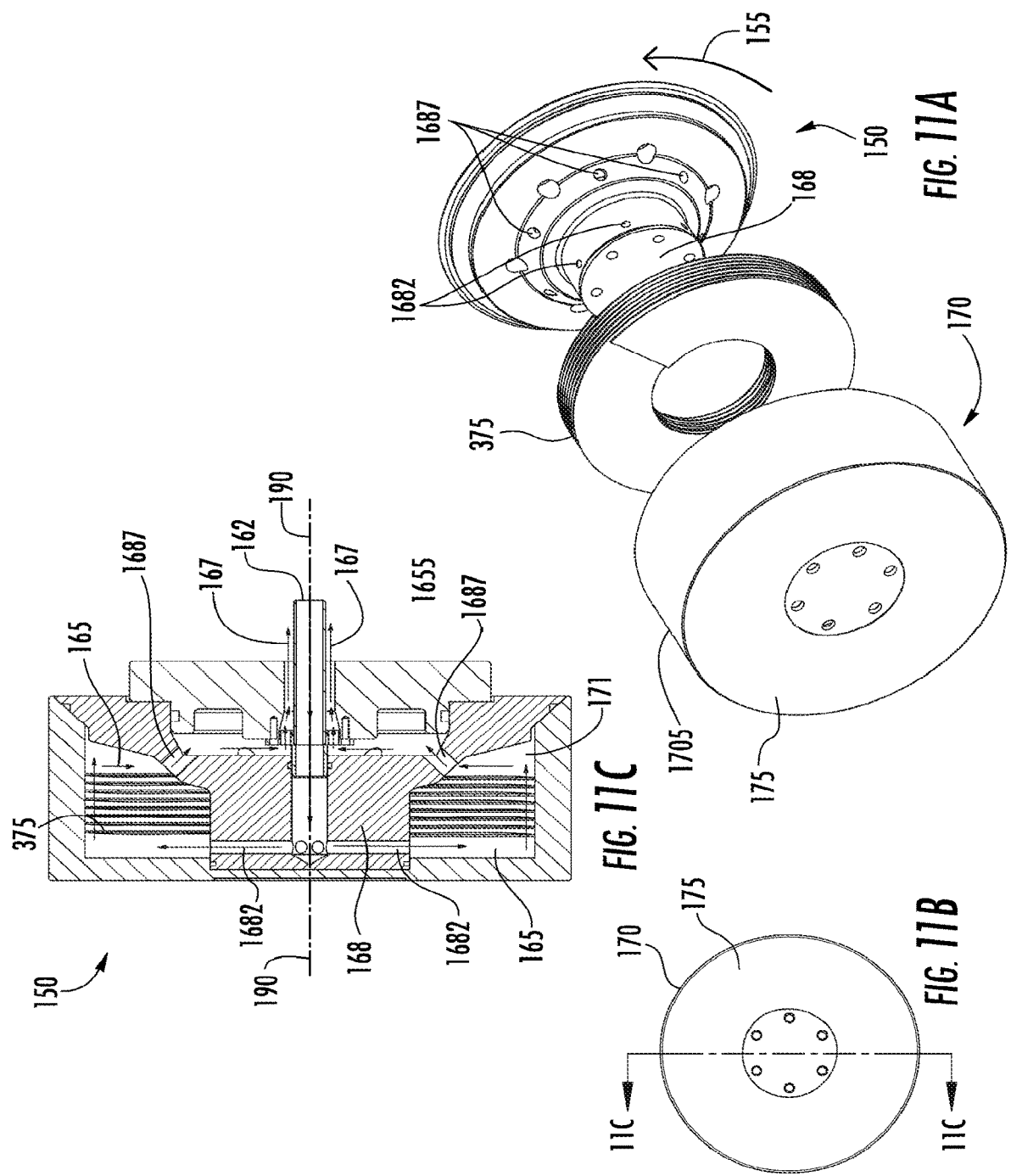

MOVING FLUID IN A ROTATING CYLINDER

RELATED APPLICATIONS

This application is a continuation of U.S. application Ser. No. 16/098,630, filed on Nov. 2, 2018, which claimed priority to International Application No. PCT/US17/30600, filed on May 2, 2017, which claimed the benefit of U.S. Provisional Application No. 62/331,246, filed May 3, 2016, all of which are hereby incorporated by reference.

TECHNICAL FIELD

This disclosure relates to apparatuses and methods of moving fluid in an axial direction in rotating cylinders, particularly (but without limitation) cylinders used in continuous manufacturing processes in which the cylinders have a heat transfer function. Examples of suitable cylinders are heated dryer drums used in paper manufacturing and cooling cylinders used in spinning metal and/or mineral wool.

BACKGROUND

Paper products may be made using rotating dryer drums, and metal wool may be made using rotating spinner wheels. While both use rotating hollow cylinders—a dryer drum or the shell of a spinner wheel—their size and function are different. Many conventional dryer drums have a large diameter (usually about 1-3 meters), a length that is multiple times greater than the diameter (usually between about 5-11 meters), operate at rotational speeds of about 300 meters per minute or more, and are used to heat paper web to evaporate water therein. By contrast, many conventional spinner wheels have much smaller diameters (usually between about 50-60 cm), a length that is usually less than the diameter (usually between about 25-35 cm), operate at relatively higher rotational speeds of about 5,000 rotations per minute or more, and may be fully filled with coolant to absorb heat from a shell used to spin threads of molten material. Because of their differences in size and operational conditions, art relating to dryer drums may not be analogous to spinner wheels and art relating to spinner wheels may not be analogous to dryer drums. However, in conventional configurations for both applications, shaft horsepower is generally used to rotate a hollow cylinder, not to move fluid within the cylinder in an axial direction, i.e., from one end or location within the cylinder to another.

Paper Manufacturing. Despite increasing energy costs, and efforts to reduce environmentally harmful emissions therefrom, energy intensive methods of making paper products have remained largely unchanged for more than a century. Drying cellulosic pulp to form paper consumes most of the energy—up to 80% of the total—used by conventional methods of making paper. For example, conventional methods may use more than 1 million joules per pound of water to be evaporated from a paper web. Any improvement that would increase efficiency, even slightly, would result in substantial savings to the industry.

The resistance to heat flow from the steam inside the dryer drum to the paper web consists of a complex conduction system with several layers of thermal resistance. Condensate must be removed from the drum because excess liquid in the drum inhibits heat transfer from the steam inside the drum to the paper web outside. Condensate also requires additional drive power for drum rotation.

For the steam inside a dryer drum, the internal condensate layer is the first major resistance to heat transfer. The level of resistance is subject to multiple factors such as condensate thickness and behavior. During normal steady state operation of the system, condensate is continuously removed, but some condensate is always present inside the drum. As rotational velocities increase to operational levels, centrifugal forces progressively increase on the condensate within the drum until it forms a substantially uniform, annular layer on the inner surface of the drum, a phenomenon called "rimming" See FIG. 5C. For example, rimming behavior may occur in a typical dryer drum with a diameter of 2 meters at rotational velocities of approximately 300 meters/minute or greater. Condensate that is rimming has generally laminar flow.

To remove condensate from a rotating dryer drum, a siphon may be used. (However, siphons are not generally used in spinner wheels.) In the paper making context, condensate must be moved up through a siphon tube (i.e., away from the inner surface of the cylinder and generally toward a central axis of the cylinder) to the outlet. Rotary siphons, which rotate with the dryer drum, and stationary siphons, which do not, are described in U.S. Pat. No. 5,335,427, issued Aug. 9, 1994, which is hereby incorporated by reference in its entirety.

In conventional configurations, the difference in pressure between a higher-pressure "supply" steam header and lower-pressure "return" condensate header is used to remove the condensate from the cylinder. To further ease its removal, some "supply" steam may be evacuated with the condensate, breaking it up into an aspirated vapor and thereby decreasing its density. The vapor is then carried out as a two-phase flow. (The vapor arises from two sources: (i) supply steam and (ii) condensate flashing into a vapor state due to the pressure drop as it travels through the siphon tube.) The "supply" steam that blows through the cylinder without condensing and giving up its latent heat to the drum system is known as "blow through" steam.

For a conventional dryer drum configuration, significant amounts of "blow through" steam, representing up to 35% or more of total steam, may be required to evacuate the condensate from the rotating dryer drum. For example, rotary siphons, which rotate with the dryer drum and require condensate to overcome centrifugal forces in the siphon shaft, may require up to 35% or more blow through steam. By contrast, because stationary siphons may utilize the relative velocity and momentum of the condensate to help move it up a stationary siphon shaft, they may require less blow through steam than rotary siphon configurations.

Although conventional means exist to promote heat transfer through a rimming condensate later, they principally act by creating turbulence. See, for example, U.S. Pat. No. 4,195,417, issued Apr. 1, 1980, and U.S. Pat. No. 7,673,395, issued Mar. 9, 2010, both of which are hereby incorporated by reference in their entirety, showing plural turbulence bars positioned parallel to the drum's central axis. While such turbulence bars may disrupt a rimming condensate layer as it overtops the bars, they are not pitched at an angle that would tend to move the condensate in an axial direction (e.g., toward the mouth of a siphon for evacuation).

Metal Wool Manufacturing. Spinner wheels may be used to manufacture metal wool and/or mineral wool. Molten material is dripped or applied onto the shell of a fast rotating spinner wheel, creating strands of the "wool" that cool mid-air. The molten material's high temperatures damage the shell of the spinner wheel, which must be regularly replaced at significant expense. Although conventional systems circulate water within a filled cylinder in an attempt to cool them, the cylinder's extremely high rates of rotation (e.g., typically between 5,000 and 6,500 rpm), inhibit circulation near the inner surface of the cylinder and prevent effective convective cooling within the cylinder. Without effective cooling, the cylinders become damaged and must be replaced.

SUMMARY

There is a need to utilize shaft horsepower for rotating cylinders to move a fluid in an axial direction within the rotating cylinder. Nonlimiting examples of a suitable cylinder include a dryer drum and a spinner wheel shell. In the paper manufacturing context, a significant amount of energy is lost because of blow through steam requirements ranging from 10-35% of the total steam delivered to the system. Accordingly, if steam could be used almost exclusively for drying paper pulp, instead of moving and removing condensate, up to 35% of energy savings could be realized. Likewise, for wool spinning applications, if water could be moved and circulated more efficiently within a cooling cylinder, greater convection could prevent damage from molten metals, significantly reducing shell replacement costs.

In one embodiment of the invention, a helical blade may be positioned on the inner surface of a cylinder such that the blade rotates with the cylinder. The blade may follow a spiral path having a central axis and one or more loops. The central axis of the spiral path may be collinear with a central axis of the cylinder. In some forms of the invention, the blade may be formed as one or more grooves in the inner surface of the cylinder wall itself or be comprised of plural, non-unitary structures that effectively act as a blade for moving fluid in an axial direction within the cylinder. Some embodiments may comprise plural blades, either at least in parallel or end-to-end.

A helical blade preferably has at least a portion of the blade with a pitch with respect to its central axis greater than 0 degrees and more preferably greater than 3 degrees and even more preferably greater than 5 degrees. To maximize axial movement of the fluid within a rotating cylinder, optimizing the blade pitch and position in the cylinder depends on several factors that depend on the implementation. Some factors include: the size and shape of the cylinder, the fluid's centripetal acceleration, viscosity, and specific gravity, and net pressure differential between the fluid inlet and outlet of the cylinder.

In some embodiments, the pitch may vary, i.e., may be different at different points, along the length of the blade. For example, a first portion of the blade (e.g., proximate to a first end of the cylinder) may have a first pitch with respect to the central axis (e.g., about 70 degrees, 80 degrees or substantially perpendicular to the central axis, i.e., about 90 degrees, or any subrange). A second portion of the blade (e.g., proximate to a second end of the cylinder) may have a second pitch that may be different than the first pitch (e.g., about 60 degrees, about 45 degrees, or substantially parallel, i.e., about 0 degrees, or any subrange).

In some embodiments, a portion of the blade between first and second points may have a pitch that varies along the length of the blade. For example, in one embodiment comprising a blade with a varying pitch, the blade's pitch at a third point between the first and second points may be different than the pitches at the first and second points. In another example, a portion of the blade at one end may have a first pitch of about 90 degrees, a second pitch at the other end of about 0 degrees, and a pitch of about 45 degrees midway between the two ends. In other words, if the interior of a hollow cylinder was hypothetically separated into six zones having an equal axial length, a blade positioned on the inner surface of the cylinder may have at least a portion of the blade in each zone with the following linearly varying pitches: 90 degrees, 72 degrees, 54 degrees, 36 degrees, 18 degrees, and 0 degrees. Pitches may vary linearly, as in the foregoing example, or non-linearly. Numerous alternative varying pitch configurations are possible, however, ranging from 90 to 0 degrees and all subranges between them.

In addition or alternatively, at least a portion of the blade may have a uniform pitch that does not vary in the axial direction. (See, e.g., FIGS. 3A and 3B.)

As the cylinder and blade rotate together, fluid on the inner surface of the cylinder may be channeled along the helical blade in at least a partially axial direction. Generally, the velocity of such fluid may be inversely proportional to the blade's pitch (relative to the central axis). For example, fluid channeled along a portion of a blade with a relatively higher pitch (e.g., 70-90 degrees) may have a lower velocity than fluid channeled along a portion of the blade with a relatively lower pitch (e.g., 70-45 degrees or less). In this example, as fluid is channeled along the blade in the cylinder, the fluid velocity in an axial direction increases, i.e., accelerates, as the pitch of the blade decreases in an axial direction. In some embodiments, the pitch may decrease to zero, becoming substantially parallel with a central axis of the cylinder.

Liquid fluid rimming on the inner surface of a cylinder forms a substantially annular shape. If the fluid is incompressible (e.g., liquid water), the fluid that is incident to, and channeled along, a blade may move at least some of the remaining fluid body in the same axial direction of its flow. In this manner, at least one helical blade may move an entire fluid body in an axial direction, even though the blade may be in contact with only a portion of such fluid body.

An inlet of a siphon may be positioned to maximize the momentum of the fluid to assist with its removal from the cylinder. At sufficient rotational speeds, the kinetic energy of the fluid may assist with overcoming the centrifugal forces within the siphon. In some embodiments, a mouth of a siphon may be positioned proximate to a blade within the cylinder.

Paper Manufacturing. In one embodiment, a helical blade may be positioned on the inner surface of a dryer drum. As the dryer drum and blade rotate, supply steam may condense on the inner surface of the cylinder. Such condensate may be channeled along the helical blade in an at least partially axial direction along the length of the dryer drum. In some embodiments, an inlet of a siphon may be positioned at one end of the blade, and, at sufficient rotational speeds, the total kinetic energy the condensate may assist with overcoming the centrifugal forces within the siphon. This may allow the drive motor rotating the dryer drum to act as a principal means of evacuating condensate, significantly reducing or eliminating the need for blow through steam.

The blade may be sized and shaped to act as a barrier such that the condensate cannot overtop the blade at rimming speeds. In addition or alternatively, at least a portion of the blade may be designed so that condensate overtops the blade. The exact shape of the blade may depend on the system's optimal operating conditions and condensate thickness, but one preferred form is an r-shape.

In one embodiment, one or more variable pitch blades may promote a substantially uniform depth of the condensate layer across the axial length of the cylinder. In the papermaking context, this may enable uniform resistance to heat transfer from supply steam, through the condensate layer and dryer drum itself, and across the width of the external paper web.

In an alternative embodiment, a constant pitch blade (i.e., a blade that is uniform and does not vary in the axial direction) may be used for systems that do not require highly uniform heat transfer or where the system includes other means to handle accumulation of fluid at one end of the cylinder. This is in part because a constant pitch spiral blade may tend to have a non-uniform condensate thickness across the axial length of the cylinder, with a smaller condensate layer thickness at one end of the cylinder (e.g., from which condensate may be drawn) and a greater condensate layer thickness at the other end (e.g., where condensate may be directed, near a siphon outlet), which may lead to a non-uniform heat profile across the external paper web.

Metal Wool Manufacturing. In one embodiment, a helical groove may be formed in the inner surface of a shell of a spinner wheel. The helical groove may follow a spiral path having a central axis and one or more loops. In some embodiments, the shell may be partially filled with any suitable coolant, such as water or ethylene glycol. In other embodiments, the shell may be substantially fully filled. As the shell rotates, fluid may be channeled along the helical groove in an axial direction. In some embodiments, the groove may have a variable pitch. In other embodiments, the groove may have a uniform pitch.

In addition or alternatively, a siphon may be positioned within a spinner wheel. In some embodiments, a stationary siphon may be positioned within a partially filled spinner wheel.

In addition or alternatively, a helical blade may be positioned within a spinner wheel. The helical blade may rotate with the spinner wheel, which may be substantially filled. The helical blade preferably has an outer diameter that may be less than the inner diameter of the shell or cage, if any, whichever is smaller. In some embodiments, the blade may have a variable pitch. In other embodiments, the blade may have a uniform pitch.

In some embodiments, a spinner wheel comprising blades and/or grooves may facilitate heat transfer from the outside of the shell to the coolant. Grooves on the inner surface of the shell increase the surface area exposed to the coolant. In addition or alternatively, a blade may be positioned to contact the inner surface of the shell such that it acts as a conductive heat sink.

The above summary is not intended to describe each illustrated embodiment or every possible implementation. These and other features, aspects, and advantages of the invention that will become better understood with regard to the accompanying drawings, description, and claims.

BRIEF DESCRIPTION OF THE DRAWINGS

The accompanying figures, where like reference numerals refer to identical or functionally similar elements throughout the separate views, serve to illustrate exemplary embodiments, forms, and aspects of the invention and to explain principles and advantages thereof:

FIGS. 5A-C show three stages of condensate behavior in a rotating dryer drum.

FIG. 7A is an exploded perspective view of a fifth embodiment for a spinner wheel.

FIG. 7C is a partially exploded perspective view of the embodiment shown in FIG. 7A.

FIG. 7D is a side elevation view of the embodiment shown in FIG. 9A.

FIG. 7E is a cross-sectional view of FIG. 7D.

FIG. 7F is a detail view of FIG. 7C.

FIG. 7G is a detail side elevation view of a siphon 180 with a shoe 184.

FIG. 8A is a partially exploded perspective view of a sixth embodiment for a spinner wheel.

FIG. 8B is a detail view of FIG. 8A.

FIG. 8C is a detail side elevation view of a siphon 180 with a scoop 186.

FIG. 9A is a partially exploded perspective view of a seventh embodiment for a spinner wheel.

FIG. 9B is a side elevation view of the embodiment shown in FIG. 9A.

FIG. 9C is a cross-sectional view of FIG. 9B.

FIG. 10A is a partially exploded view of an eighth embodiment for a spinner wheel.

FIG. 10B is a side elevation view of the embodiment shown in FIG. 10A.

FIG. 10C is a cross-sectional view of FIG. 10B.

FIG. 11A is a partially exploded perspective view of a ninth embodiment for a spinner wheel.

FIG. 11B is a side elevation view of the embodiment shown in FIG. 11A.

FIG. 11C is a cross-sectional view of FIG. 11B.

DESCRIPTION

Figure 1A:
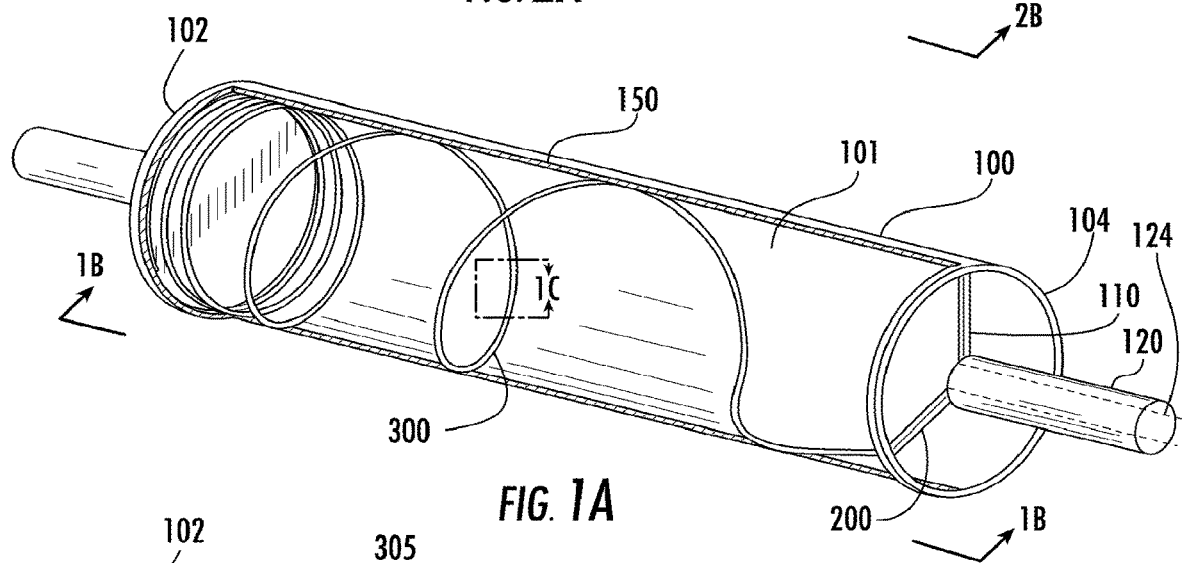
FIG. 1A is a perspective view of a first embodiment of the invention for a dryer drum.
Figure 3A:
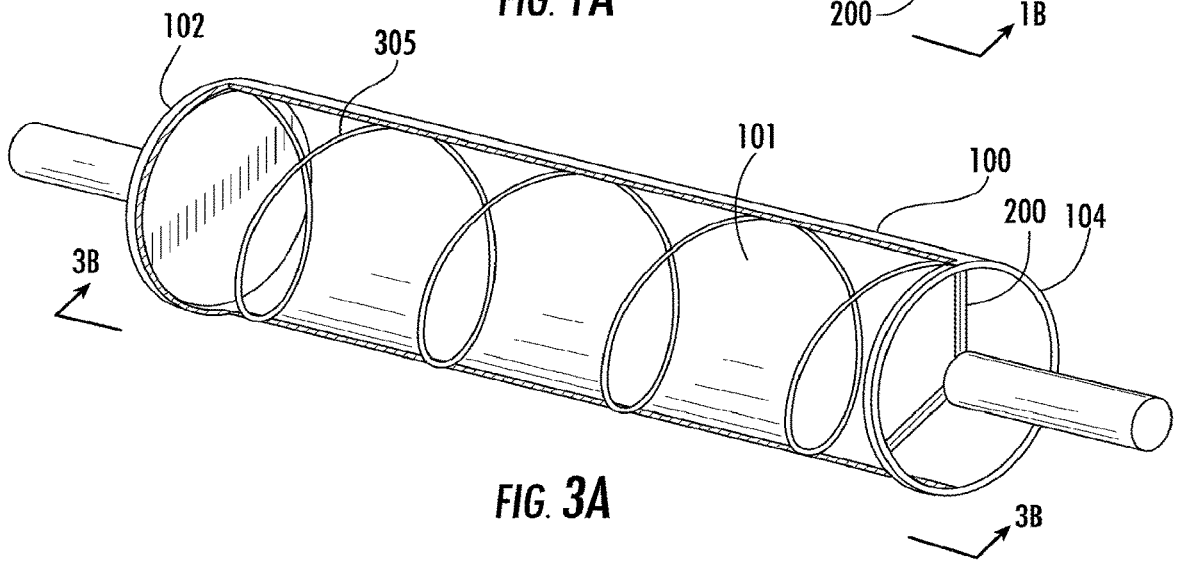
FIG. 3A is a perspective view of a third embodiment for a dryer drum.
Figure 2B:
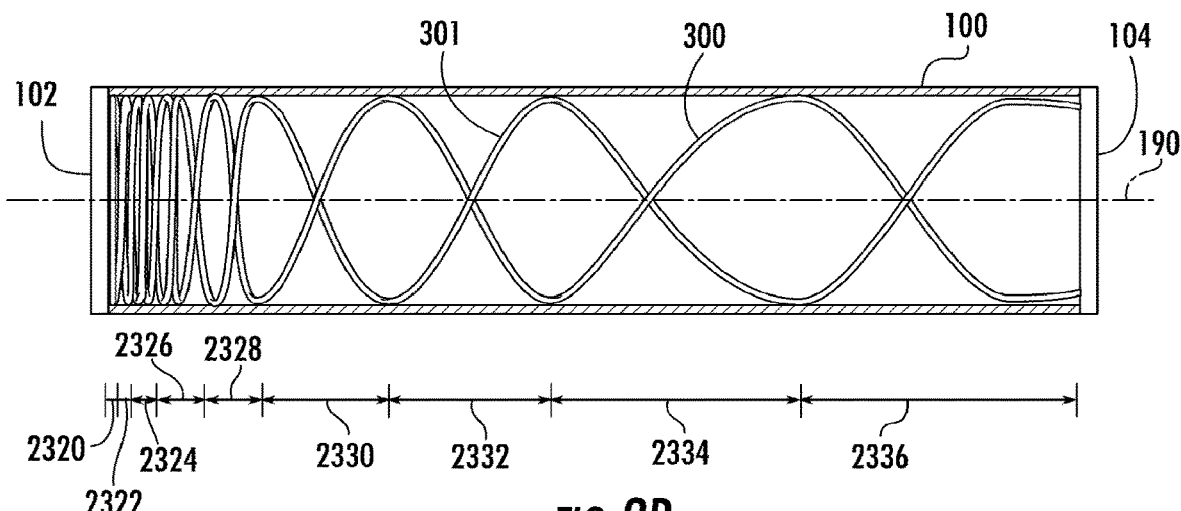
FIG. 2B is a side elevation view of the embodiment shown in FIG. 2A.

Apparatus and methods of moving fluid in a rotating cylinder are described. An apparatus embodying features of the present invention is shown in FIGS. 1A-D. FIG. 1A shows a cylinder 100, such as a sealed dryer drum for making paper products. The cylinder 100 has a first end 102 and a second end 104. The cylinder 100 may be supported by support members 110 attached to shaft 120. A motor (not shown) drives the shaft 120 to rotate the cylinder 100. The interior of cylinder 100 may be in fluid communication with an inlet (i.e., the annulus between the shaft 120 and condensate outlet 124) through which a heating fluid, such as steam, may be pumped into the cylinder via shaft 120. As explained in more detail below, condensate may be removed from the cylinder 100 via rotary siphon 200 through outlet 124. Alternative embodiments may utilize a stationary siphon.

As shown in FIG. 1A, a spiral blade 300 may be positioned on inner surface 101 of cylinder 100 such that the blade 300 rotates with the cylinder 100. The blade 300 may be fixedly or removably attached to the cylinder 100, including by friction, magnets, welding, crossbeams extending across the interior of the dryer drum, or hoop segments (not shown). If scale is present on the inner surface 101, it is preferably reduced or removed before the blade 300 may be installed and/or positioned thereon.

The blade 300 may be formed from any suitable material that can withstand the operating environment within the cylinder 100, such as stainless steel, carbon steel, aluminum, and other corrosion-resistant alloys and polymers. In addition or alternatively, the blade 300 may be formed as a groove 370 in the inner surface of the cylinder 100 itself (see e.g., FIG. 12). The blade 300 may be coated with a material that prevents scale build up, such as a quench-polish-quench (or "QPQ") process.

Figure 1B:
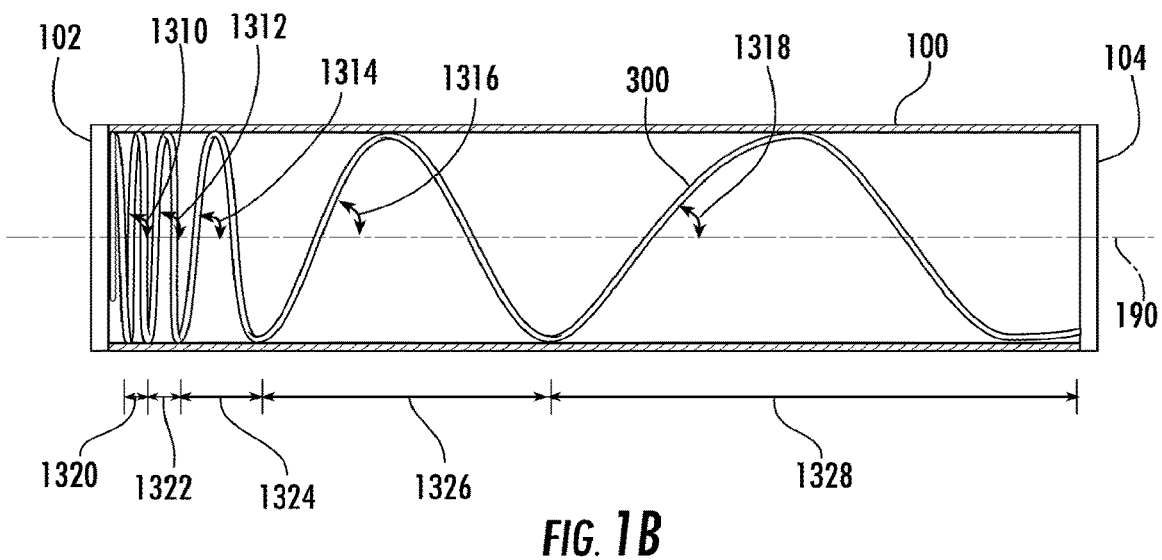
FIG. 1B is a side elevation view of the embodiment shown in FIG. 1A.

As shown in FIG. 1B, one embodiment of the blade 300 comprises six loops around a central axis 190, wherein the blade 300 has a pitch with respect to the central axis 190 that varies in the axial direction. The first loop proximate to first end 102 forms a pitch with the central axis 190 that may be substantially perpendicular to the central axis 190. The second pitch 1310 and successive pitches 1312, 1314, 1316, and 1318 have gradually lesser slopes until the end of the blade 300 approaching second end 104 may be substantially parallel with central axis 190. Accordingly, the distance 1320 between the first loop and the second loop may be less than the distance 1322 between the second and third loop, which may be less than the distance 1324 between the third and fourth loop, and so on.

By adjusting the pitch of the blade 300, the velocity of the fluid at a given point in the drum may be increased or decreased. Accordingly, alternative embodiments may have more or fewer loops with varying and/or uniform pitches, depending on the length of the cylinder, its diameter, steady-state rotational velocity and centripetal force, viscosity of the fluid, pressure differential between inlet and outlet, and desired axial velocity of condensate at a given point, e.g., proximate to the mouth of a siphon.

Viewing FIG. 1A, as the pitch of the blade 300 decreases along the axial length of the dryer drum 100 from the first end 102 to the second end 104, the velocity of the condensate increases in the axial direction toward siphon 200. In this manner, a blade 300 with a variable pitch prevents condensate from collecting at the second end 104 of cylinder 100, thereby promoting more uniform heat transfer from steam to the dryer drum 100.

Figure 3B:
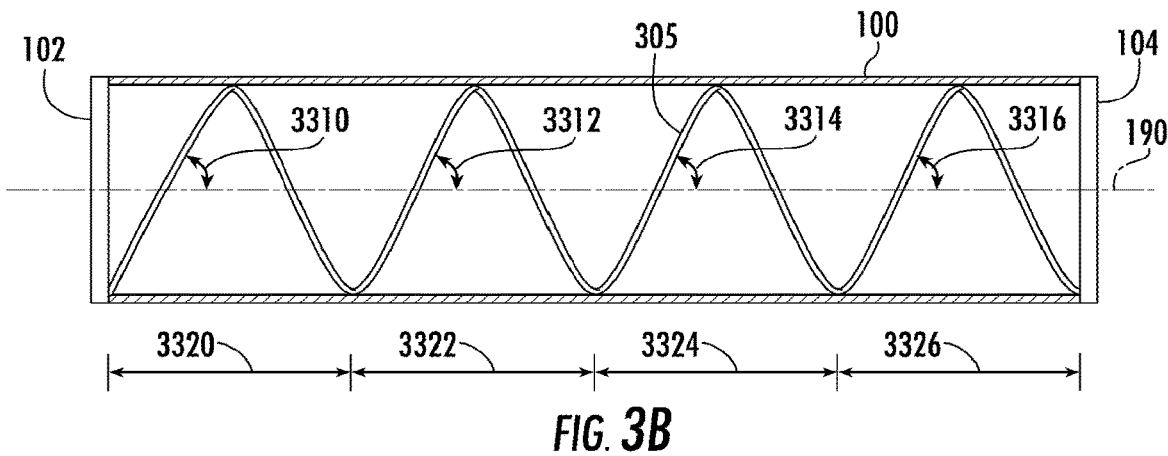
FIG. 3B is a side elevation view of the embodiment shown in FIG. 3A.

By contrast, FIG. 3B shows an alternative embodiment of the blade 305 with four loops and a uniform pitch respect to the central axis 190, which remains constant in the axial direction. The first loop proximate to the first end 102 forms a pitch 3310 with the central axis 190. The pitches 3312, 3314, 3316 for the second, third, and fourth loops may be approximately the same as the first pitch 3310. Likewise, each distance between loops, 3320, 3322, 3324, 3326 may be approximately the same. Because of the uniform pitch, in this configuration the condensate may tend to have a smaller depth on first end 102 and a somewhat greater depth toward the second end 104, which (as explained above) can lead to a non-uniform heat profile on the outer surface of the dryer drum 100.

Returning to FIG. 1A, in operation steam may be pumped into the cylinder 100 via shaft 120. As the steam gives up its latent heat, condensate forms (not shown) on the inner surface 101. Viewing FIGS. 5A-C, as the rotational velocity of the cylinder 100 increases from nil to steady state operating speeds, centrifugal forces acting on condensate 500 gradually overcome the force of gravity in three successive stages: puddling (FIG. 5A), cascading (FIG. 5B), and rimming (FIG. 5C). In the puddling stage shown in FIG. 5A, the force of gravity predominates and fluid 500 tends to puddle near the bottom of the cylinder. Next, in the cascading stage shown in FIG. 5B, friction causes the fluid 500 to travel up the inner surface of the cylinder 100 and cascades back to the bottom. Cascading action consumes significant power from the drive motor. Finally, as shown in FIG. 5C, the cylinder's 100 centrifugal forces overtake the force of gravity and the fluid 500 starts rimming to form a substantially uniform, annular layer. In general, a cylinder system comprising one or more blades 300 within a rotating cylinder 100 may tend to reach a rimming state at lower rotational velocities than if the blade 300 was absent.

Viewing FIG. 1A, as the cylinder 100 rotates at steady-state rimming speeds, the blade 300, which rotates with cylinder 100, moves condensate from the first end 102 of cylinder 100 to the second end 104 of cylinder 100. A siphon 200 may be positioned proximate to the second end 104 to facilitate evacuation of condensate from the cylinder 100 through outlet 124. In other words, the blade 300 may be shaped and positioned on the inner surface 101 of the cylinder 100 such that the condensate may be channeled along the blade toward the second end 104 of the cylinder 100 (and ultimately to the outlet 124). Condensate may tend to accelerate as it travels along the variable pitch blade 300, i.e., as the pitch of the blade 300 decreases and becomes aligned with central axis 190 (see also FIG. 1B). A siphon 200 may be positioned proximate to the second end 104 to facilitate evacuation of condensate from the cylinder 100 through outlet 124.

At steady-state rimming speeds, the force applied by the blade 300 on the condensate may be transmitted throughout the incompressible condensate medium (not shown). In other words, the force of the blade 300 on condensate incident to blade 300 may be transmitted through the rimming condensate medium, causing the entire body of fluid to flow toward the second end 104. Condensate is preferably accelerated in an axial direction by the blade 300 to speeds that may be sufficient to at least enter a rotary siphon 200. In more preferably embodiments, the fluid may have sufficient moment to also overcome centrifugal forces within the siphon 200 using little to no blow through steam, and exit the cylinder 100 through outlet 124.

In some embodiments, a rotary siphon 200 may be preferred because it can be fixedly positioned on or near a terminal end of the blade 300 proximate to the outlet 124. The rotary siphon 200 also allows for a very small gap (less than 8 mm) between the siphon inlet and the inner surface 101 of cylinder 100. This gap may define the thickness of the condensate layer, thereby reducing resistance to heat transfer from the steam to the dryer drum 100.

Figure 1C:
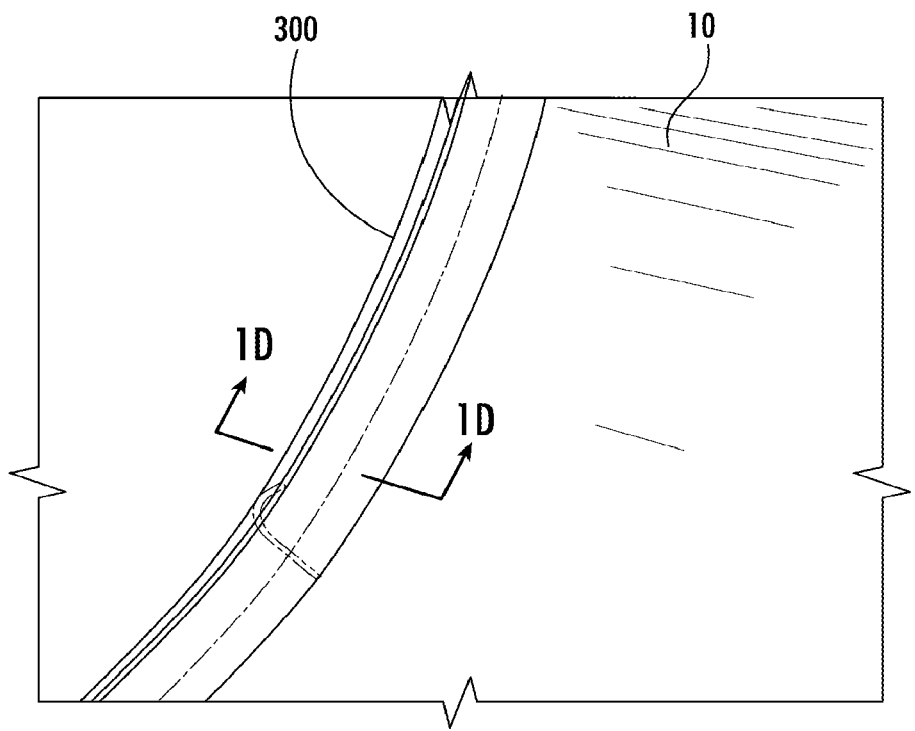
FIG. 1C is a detail of FIG. 1A.
Figure 1D:
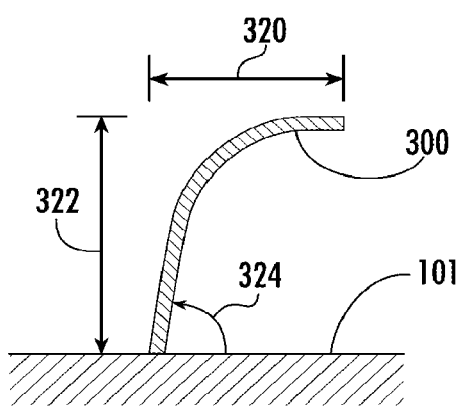
FIG. 1D is a cross-sectional view of the embodiment shown in FIG. 1C.

Turning to FIG. 1D, the blade 300 may be r-shaped with a height 322 and width 320. The base of blade 300 may form an angle 324 with a tangential plane of the inner surface 101. In one preferred embodiment, the blade 300 has a height 322 of less than about 10 cm and angle 324 (approximately 80 degrees) to prevent condensate from over-topping the blade 300 under rimming conditions. Alternative embodiments of blade 300 may utilize a vertical cross-section, an L-shape, or other cross-section shapes. The base of blade 300 may form an angle 324 that is preferably degrees or less. Other embodiments may have a blade 300 that forms an obtuse angle 324. Other embodiments may have a height 322 of between 5 cm to 20 cm or more or any subrange therein.

Certain configurations may require blow through steam, but such blow through steam is preferably less than 15% of the supply steam, and more preferably less than 1-10% of the supply steam, and even more preferably less than 0.5-5% of supply steam, introduced into the dryer cylinder.

In other configurations without blow through steam, an end of the blade 300 may form a liquid seal with a siphon 200, i.e., the mouth of the siphon 200 may be substantially submerged in the condensate, enhancing evacuation efficiency and flow monitoring. Because the liquid seal prevents steam from exiting the cylinder through the siphon 200, the steam may be forced to impart substantially all its latent heat of vaporization to the system before condensation and evacuation, allowing further process heating optimization of the steam heating medium.

In the context of manufacturing paper products, the apparatus and methods described herein provide three significant advantages over an unmodified dryer drum or a drum with mere turbulence bars.

First, the need to use blow through steam to remove condensate from the cylinder 100 may be significantly reduced or eliminated. The spiral shape of the blade 300 imparts a force to the condensate in an axial direction and provides the means for moving condensate within the cylinder 100 toward the outlet 124. Thereby the rotation of the cylinder 100 itself may be a principal source of the kinetic energy used for evacuating the condensate.

Second, unlike drums with turbulence bars, pitched blades 300 may accelerate condensate medium to turbulent flow velocities without interrupting its path toward evacuation near the second end 104. This reduces the amount of time condensate resides within the cylinder as well as reduces the heat resistance across the condensate layer.

Third, evacuating a single phase liquid eliminates the need for complex control systems and allows for significantly improved flow measurements. In particular, vapor recompression devices and other components required for recapturing two-phase flows with high levels of blow through steam are highly inefficient. Moreover, most conventional flow measurement technology cannot accurately measure two-phase flow comprising condensate aspirated at a siphon inlet because of widely divergent mass density, specific gravity, and velocity profiles associated with such media. A single phase liquid, by contrast, allows for highly accurate flow control, differential pressure control, and quantitative measurements using relatively inexpensive, conventional devices.

However, not all embodiments are required to have any or all the foregoing advantages.

Figure 2A:
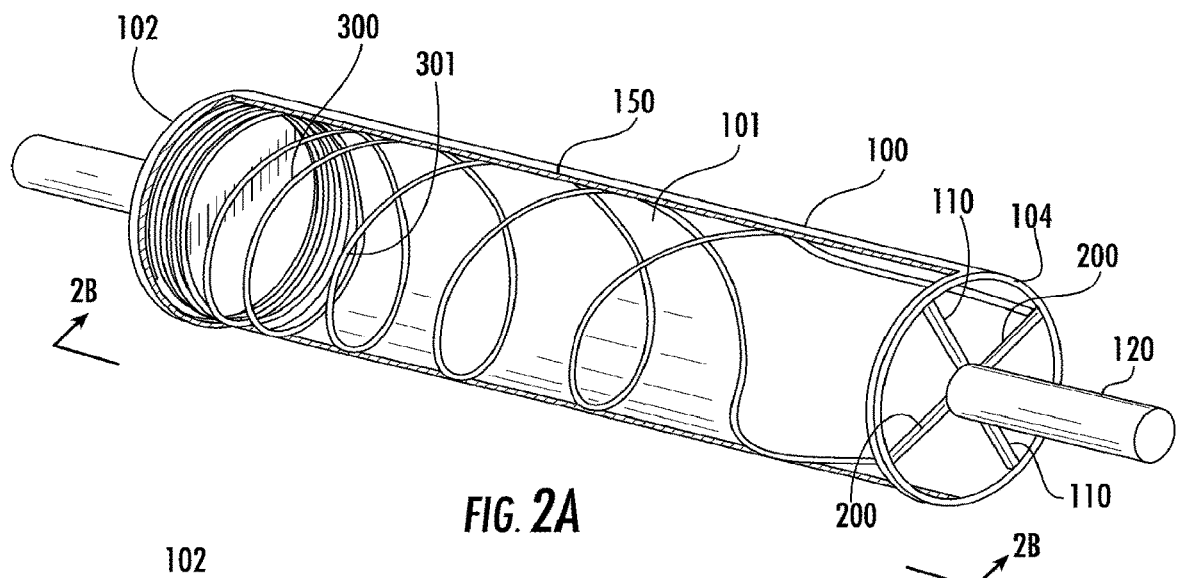
FIG. 2A is a perspective view of a second embodiment for a dryer drum.
Figure 4A:
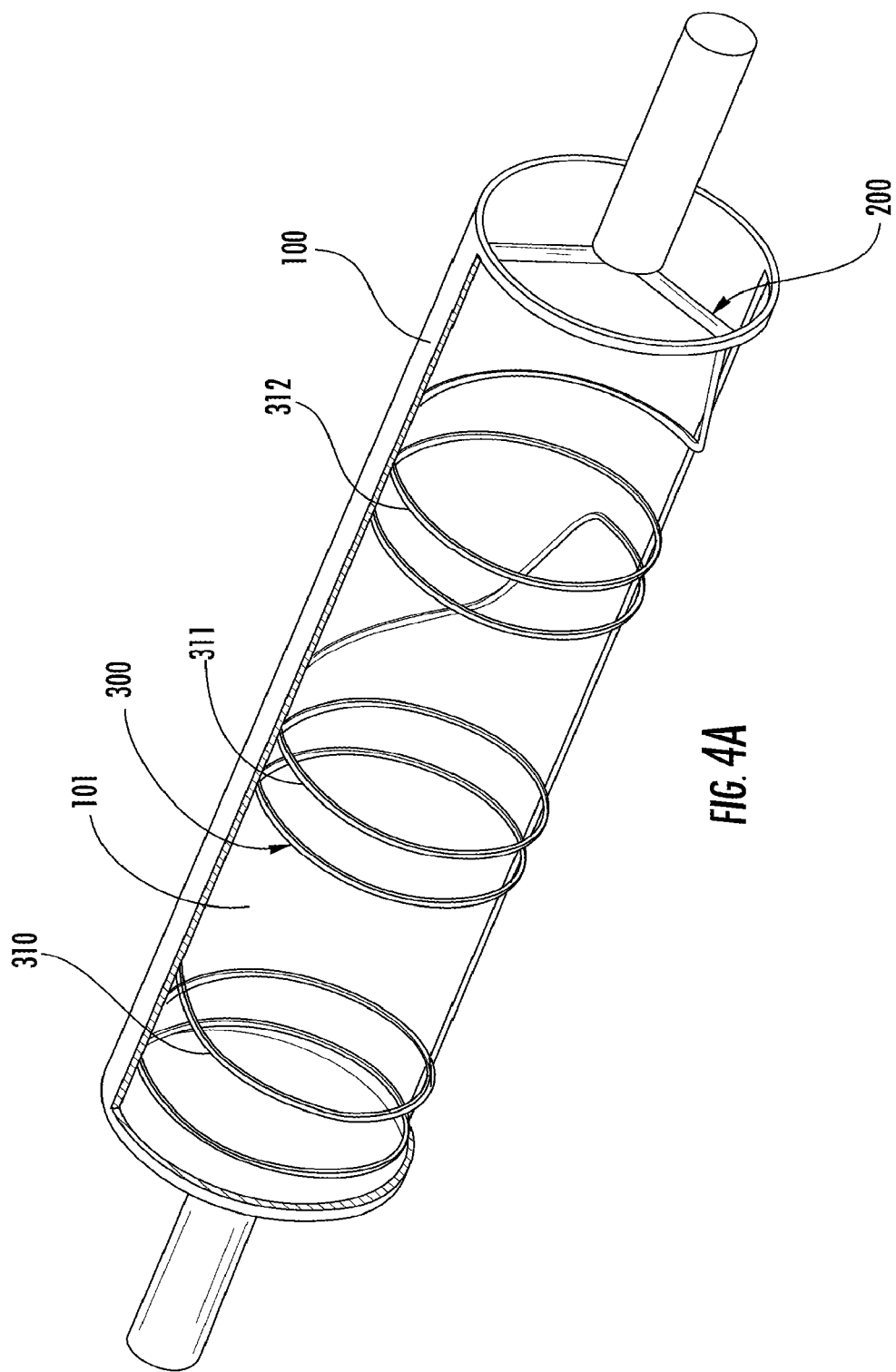
FIG. 4A is a perspective view of a fourth embodiment for a dryer drum.

Turning to FIGS. 2A-B and 4A-B, embodiments comprising plural variable pitch blades or blade segments are shown. FIG. 2A shows two variable pitch blades 300, 301 positioned in parallel, one rotated 180 degrees from the other. FIG. 4A shows three variable pitch blade segments 310, 311, 312 connected to one another in series.

Viewing FIG. 2A, two blades 300, 301 may facilitate rimming of condensate within the rotating cylinder 100 at lower rotational velocities than configurations with a single blade 300 or no blade. Further, comparing FIG. 1B (showing one blade 300) and FIG. 2B (showing two blades 300, 301), at rimming speeds, the average distance between the nearest blade and condensate at any given point on the inner surface 101 of the cylinder 100 may tend to be less with two blades 300, 301 than one blade 300.

In addition or alternatively, embodiments with two or more blades 300, 301 may have one blade with more or fewer loops than the other blade or the same or different pitch profile.

FIG. 3B shows a blade 305 having a uniform pitch relative to the central axis 190, wherein pitches 3310, 3312, 3314, and 3316 may be approximately 45 degrees with respect to longitudinal axis 190. The blade 305 may facilitate the movement of fluid from a first end 102 of the cylinder 100 to a second end 104. But, as explained above, in an embodiment with a uniform pitch blade 305 as shown in FIG. 3B, the condensate layer may have a smaller thickness proximate to first end 102 and tend to have a gradually greater thickness toward the second end 104. In the context of a paper machine, a non-uniform condensate layer may lead to a non-uniform temperature profile for the paper web, because a greater condensate thickness creates a greater resistance to conductive heat transfer from internal steam to the inner surface 101 of the cylinder 100. Accordingly, if a uniform pitch blade 305 is employed, it may be preferably in medium or low grade paper applications or other applications where non-uniform heat profiles may be acceptable.

Figure 4B:
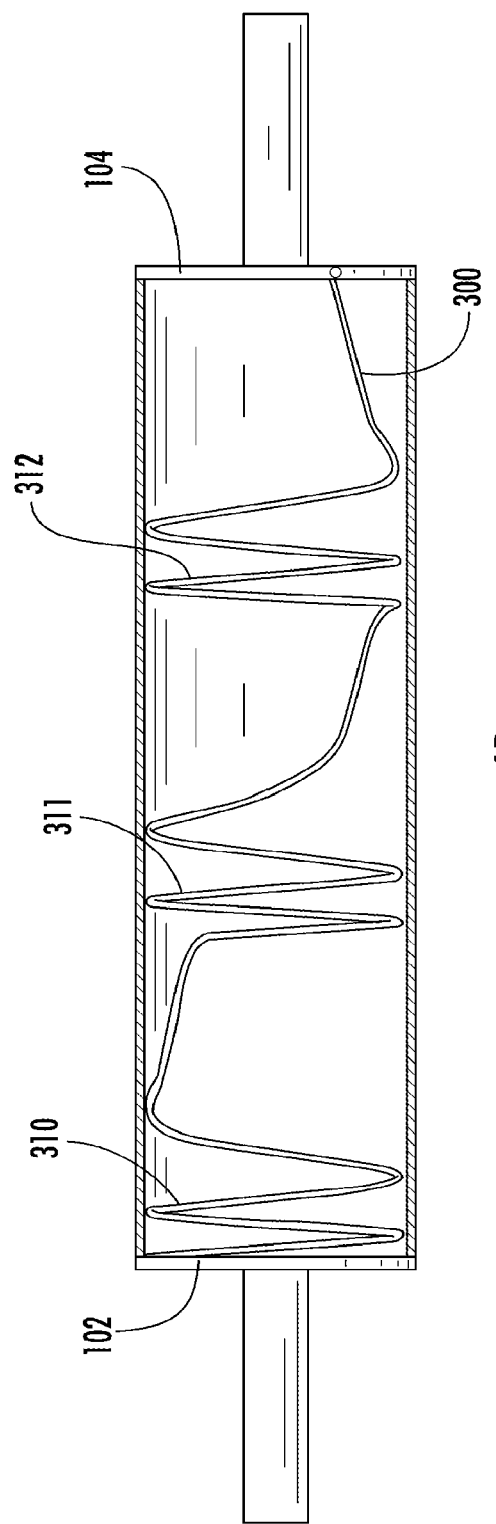
FIG. 4B is a side elevation view of the embodiment shown in FIG. 4A.

FIG. 4B shows several variable pitch segments 310, 311, 312 arranged in series along the longitudinal axis of the cylinder. Two continuous transitions separate segments 310, 311 and segments 311, 312 of the blade 300. In this embodiment, both transitions may be located between a substantially zero final pitch angle with respect to central axis 190, where one segment ends, and a pitch angle which is almost 90° at the beginning of the next segment. In addition or alternatively, other transitions and pitch angles could be used and optimized depending on the size and rotational speed of the rotating cylinder and the number of segments and other optimization factors discussed in this disclosure.

At each successive segment, the velocity of condensate entering the segment may be progressively greater than the previous segment and, therefore, the velocity of condensate exiting each segment may be progressively greater. For example, the axial velocity of condensate may be approximately nil at the first loop of segment 310 proximate to first end 102. Condensate may then accelerate across the first segment 310 before entering the second segment 311 and then further accelerated before entering the third segment 312. Accordingly, use of plural segments may allow progressively higher condensate flow velocities along the longitudinal axis of the cylinder toward the end 104 of the cylinder. In some embodiments, a blade 300 comprising plural segments (e.g., as shown in FIG. 4B) may be configured to achieve greater axial fluid velocities than a single continuous segment (e.g., as shown in FIG. 1B).

Figure 6:
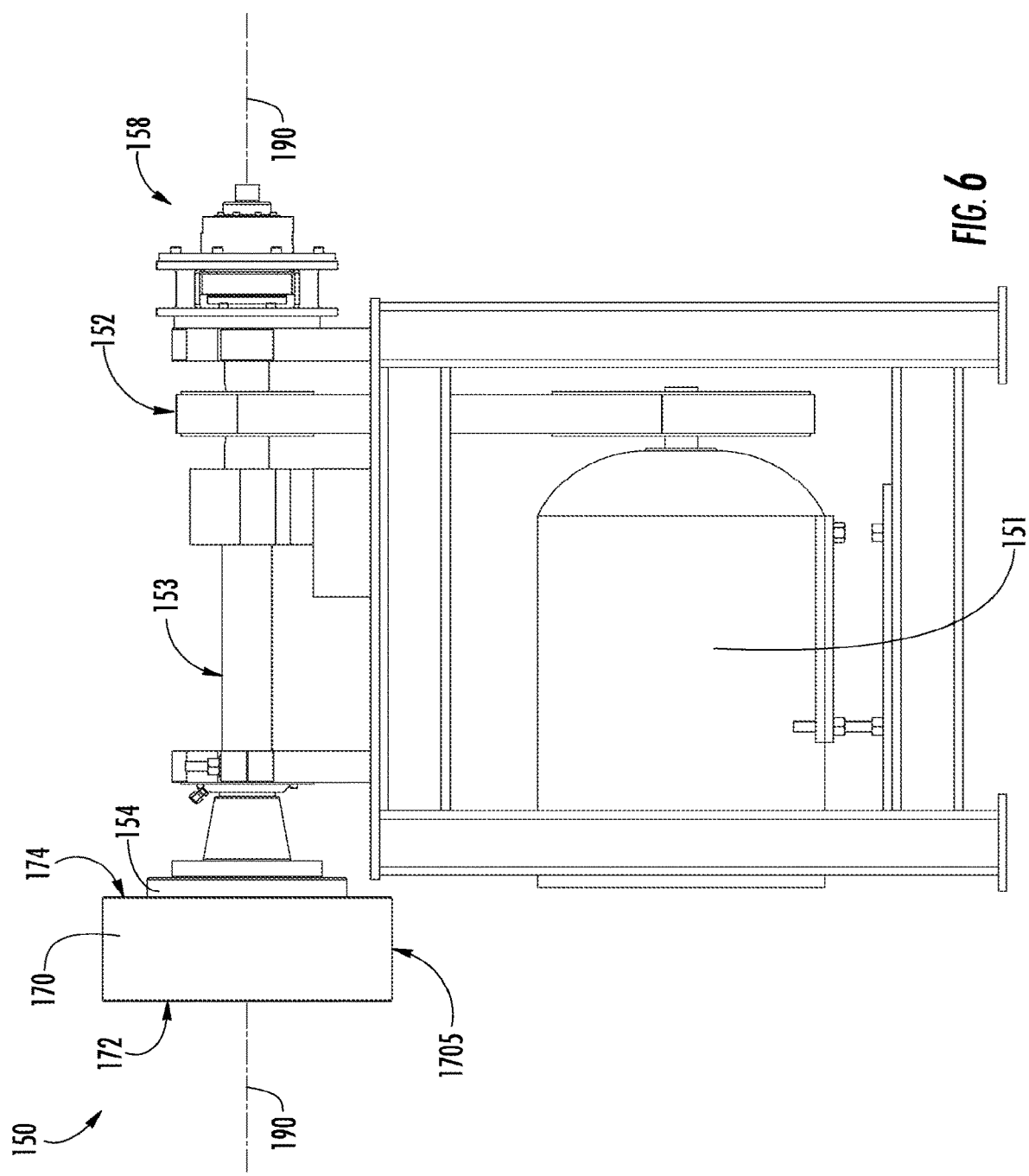
FIG. 6 is a schematic view of a one embodiment for a spinner wheel.

Apparatuses embodying features of the present invention suitable for spinner wheels are shown in FIGS. 6-12. FIG. 6 shows a spinner wheel drive system comprising a motor 151 powering a shaft 153 by a belt 152. A wheel 150 may be operably attached to the shaft 153 through a journal 154 and rotate about a central axis 190. The system may further comprise a coolant exchanger 158. FIG. 6 further shows one wheel 150 formed in part by a shell 170 with an outer surface 1705.

In operation, the wheel 150 may be at least partially filled with a coolant (not shown) and spun by a motor shaft 153 at high rotational speeds (e.g., 4,000 to 7,000 rotations per minute and any subrange between). In one application, molten metal may be dripped or poured onto the outer surface 1705 of the shell 170, and, on impact with the outer surface 1705, the metal elongates to become thin strands of metal, also known as "mineral wool" or "metal wool." Without adequate cooling, the shell 170 may become damaged and must be replaced.

Figure 7B:
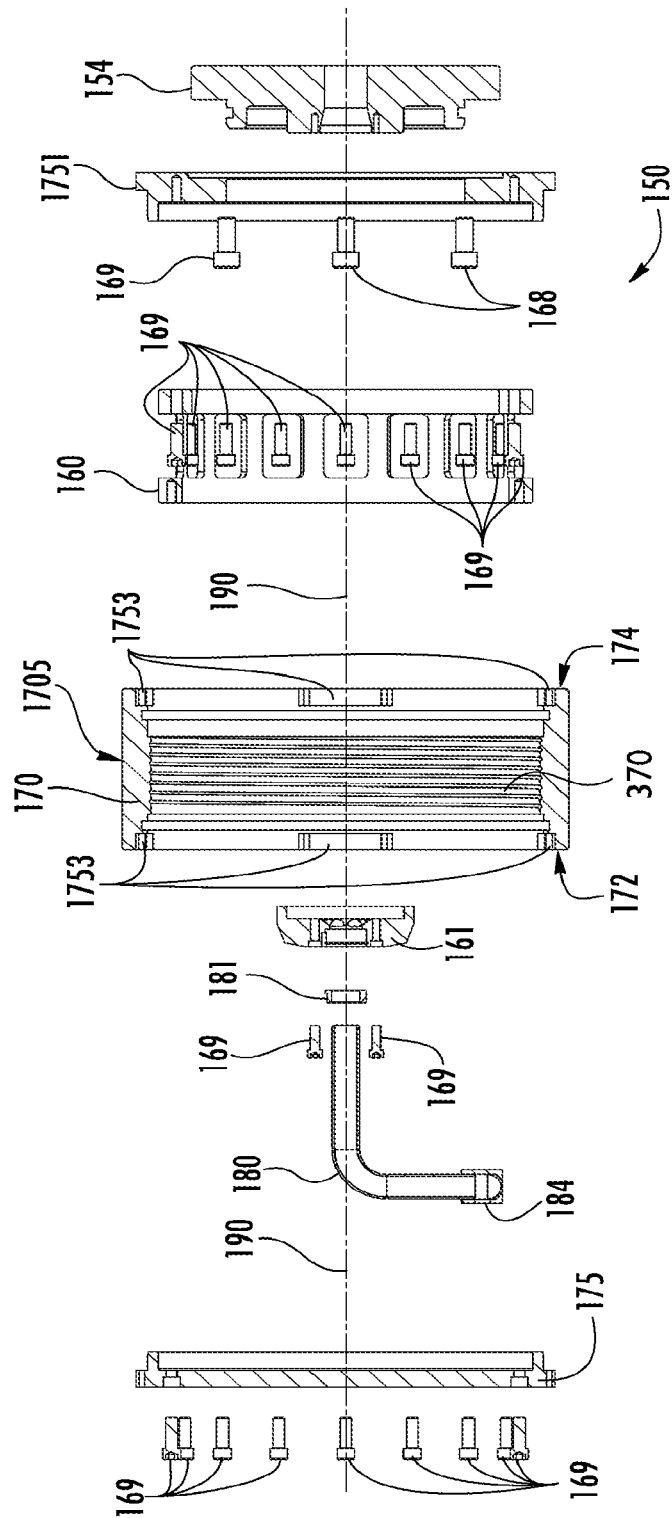
FIG. 7B is a cross-sectional view of FIG. 7A.

Turing to FIG. 7B, one embodiment of a spinner wheel 150 may comprise an outer endcap 175, a shell 170, and inner endcap 1751. A support cage 160 may be positioned within the shell 170 and be coupled to the outer and inner endcaps 175, 1751. The inner endcap 1751 may be coupled to a journal 154, which may translate shaft drive power to rotate the wheel 150. Hub 161 may be coupled to journal 154. As shown in FIG. 7A, the forgoing elements are coupled to one another, respectively, by fasteners 169. For example, the outer endcap 175 and inner endcap 1751 may comprise a plurality of bores 1757 that align with bores 1608 in cage 160. The cage 160 may be coupled to the outer and inner endcaps 175, 1751 by fasteners 169 (see also FIGS. 7C, 8A and 9A). The inner endcap 1751, in turn, comprises a plurality of bores 1756 that align with bores 1545 in journal 154, and they are coupled together by fasteners 169. Viewing FIG. 7A, the outer and inner endcaps 175, 1751 may comprise flanges 1752. The shell 170 may comprise a plurality of notches 1753 sized to operably couple with said flanges 1752 (see also FIGS. 7D, 8A, 9A and 9B). Alternative embodiments may employ different or additional coupling means, such as welds, fasteners, and other coupling means. Alternative embodiments of a spinner wheel 150 may not comprise a cage 160 (see, e.g., FIGS. 10-12) or a shell 170 without grooves 370 (see, e.g., FIGS. 10-11).

Turning to FIG. 7C, a shell 170 may be a hollow cylinder with a helical groove 370 in its inner surface 171. In one embodiment, the groove 370 has a uniform pitch. Alternative embodiments of shell 170 may have a groove 370 with a varying pitch (see, e.g., FIG. 12) and/or plural grooves 370. The shell 170 may be coupled to an endcap 175. The endcap 175 may have a flange 1752, and the shell 170 may have a notch 1753 sized to operably couple with the flange 1752.

A cavity 165 may be defined by the shell 170 and inner and outer endcaps 175, 1751. Cage 160 is positioned within the cavity 165, forming a gap 1655 between the outer diameter of the cage 160 and the inner surface 171 of the shell 170.

Viewing FIG. 7C, a spinner wheel 150 may comprise a hub 161 and a siphon 180. At least a portion of the siphon 180 may be positioned within the hub 161 and may be supported by a bushing 181 (see FIG. 7B). The hub 161 may have a plurality of apertures 1615 in fluid communication with inlet 162 (see FIG. 7E), and the siphon 180 may be in fluid communication with the outlet 167 (see FIG. 7E). Except for the siphon 180, which is stationary in the embodiment shown, the other components of the wheel 150 rotate in direction 155 about central axis 190 (see FIG. 7E). Alternative embodiments may comprises a rotary siphon.

Turning to FIG. 7E, fluid (not shown), such as coolant, may be circulated within gap 1655 to cool the shell 170. Fluid may enter the wheel 150 under pressure via annular inlet 162 and through a plurality of apertures 1615 in hub 161. In one embodiment, the apertures 1615 distribute the fluid in a radial direction (shown by arrows extending from hub 161) towards the inner surface 171 of shell 170. As the wheel 150 rotates in direction 155 (see FIG. 7C), centrifugal forces push fluid to the inner surface 171 of the shell, and, as noted above, fluid in gap 1655 may cool shell 170. As the wheel rotates about central axis 190, the groove 370 imparts a force to the fluid in the gap 1655 in an axial direction away from a first end 172 of the wheel 150 and toward a second end 174 of the wheel 150. In this manner, the groove 370 helps to circulate fluid within the wheel 150 and to mix high temperature fluid with lower temperature fluid injected from apertures 1615. The groove 370 also increases the surface area of the inner surface 171 exposed to coolant, enhancing heat exchange between the shell 170 and coolant. Fluid is removed via siphon 180, which is in fluid communication with outlet 167.

As shown in FIG. 7G, a shoe 184 may be coupled to the distal end 182 of a stationary siphon 180. The shoe 184 may have a mouth 185 flanked by a skirt portions 1845. The cage 160 has a plurality of apertures 1605 that allow fluid to pass from the gap 1655 to the mouth 185. The mouth 185 may be in fluid communication with the siphon 180, which, in turn, is in fluid communication with the outlet 167 (see FIG. 7E). Viewing FIG. 7F, the wheel may be filled with fluid (not shown) up to the level of the mouth 185 of the shoe 184. The shoe 184 is preferably made with Teflon or other low friction and/or sacrificial material to prevent or minimize catastrophic failure if the stationary shoe 184 contacts any other part of the fast rotating spinner wheel 150.

In some embodiments, the shoe 184 is positioned with a small clearance (between about 3-6 mm or any subrange between) between the mouth 185 and the inner diameter of the cage 160. Therefore, most of the volume of coolant within the wheel 150 resides in gap 1655 between the cage 160 and the inner surface 171 of the shell 170 (see FIG. 7C). This is contrary to most conventional designs, which fully flood a spinner wheel with coolant.

Returning to FIG. 7E, in some embodiments, the lateral position of the siphon 180 between first end 172 and second end 174 may correspond to the approximate location that molten material initially contacts the outer surface 1705 of shell 170. This configuration allows high temperature fluid near the inner surface 171 of the shell 170 to travel the shortest path to the siphon mouth 185 (see FIG. 7F). In alternative configurations, the siphon 180 may have a lateral position that is offset from the point of contact for molten material, and one or more grooves 370 may impart a force to move fluid toward the mouth 185.

In these and other embodiments, one or more helical grooves 370 may be configured to impart a force to move fluid from either or both first and second ends 172, 174 toward the siphon 180 and more preferably to its mouth 185 (see FIG. 7F). For example, a first helical groove 370 in the inner surface 171 of the shell 170, positioned at least between the first end 172 of the wheel and the siphon 180, may have a helical shape that is in a clockwise or counterclockwise direction (depending on the direction of rotation of the wheel 150) to impart a force to move fluid toward the siphon 180. In addition or alternatively, a second helical groove 370 positioned at least between the second end 174 of the wheel and the siphon 180 may have a spiral path in the opposite direction as the first groove 370. Together, the first and second grooves 370 may cooperate to impart a force to move fluid toward a means to evacuate it from the cylinder, such as a siphon.

In addition or alternatively, all or a portion of one or more grooves 370 may have a pitch with respect to a central axis 190 such that it has a uniform pitch or a varying pitch. Alternatively, a shell 170 may neither comprise a blade nor groove 370 on or in its inner surface 171.

Turning to FIG. 8B, one alternative to a shoe 184 (see FIG. 7F) is a scoop 186. The scoop 186 may be coupled to the siphon 180 such that the mouth 185 of the scoop 186 is in fluid communication with the siphon 180. In comparison with a shoe 184, a scoop 186 has a narrower cross-sectional area, resulting in less drag from the fluid it contacts and therefore less torque on the siphon 180. In preferred embodiments, both the shoe 184 (see FIG. 7G) and the scoop 186 (see FIG. 8C) have a curved portion that redirects incoming fluid up into the siphon 180.

Turning to FIG. 9A, an alternative embodiment of the wheel 150 is shown. The wheel 150 comprises a shaft 164, a blade 375, a cage 160, a hollow cylindrical shell 170, an endcap 175. The blade 375 and the cage 160 may be positioned within the shell 170. A plurality of fasteners 169 may couple the endcap 175 to the cage 160. The endcap 175 may have a plurality of flanges 1752, and the endcap 175 may be coupled to the shell 170 through a plurality of notches 1752 sized to operably couple with the flanges 1752. The blade 375 may be positioned around the shaft 164. In some embodiments, the blade 375 may be coupled to the shaft 164 and/or the cage 160 such that it rotates with the wheel 150.

Viewing FIG. 9C, the wheel 150 may further comprise an inner endcap 1751 coupled to a rotatable journal 154. The journal 154 may be powered by a drive shaft 153 (see FIG. 6), and the journal may translate shaft drive power to rotate the wheel 150 in a direction 155 (see FIG. 9A) about a central axis 190.

A cavity 165 within the wheel 150 may be defined by an outer endcap 175, an inner endcap 1751, and an inner surface 171 of the shell 170. For embodiments comprising a cage 160, the cavity 165 may be formed in part by a gap 1655 between the outer diameter of the cage 160 and the inner surface 171 of the shell 170. The cavity 165 and/or gap 1655 may be partially or substantially fully filled with fluid.

Viewing FIG. 9A, the wheel 150 may further comprise an inlet plate 1665 and outlet plate 166 disposed around shaft 164. In some embodiments, the plates 166, 1665 may be conically shaped. Alternative embodiments may not comprise an inlet plate 1665 and/or outlet plate 166.

Fluid may circulate through wheel 150 in either a partially or substantially fully filled configuration. Returning to FIG. 9C, fluid enters the wheel via inlet 162. An annular shaft 164 may comprise a plurality of apertures 1645 in fluid communication with the inlet 162 and cavity 165. As fluid enters the cavity 165 from apertures 1645, a plate 1665 may help direct the fluid in a radial direction away from the central axis 190 and toward the inner surface 171 of the shell 170. Fluid may travel through the gap 1655 and through and around the blade 375 from a first end 172 of the wheel 150 to a second end 174 of the wheel 150. The blade 375 and/or groove 370 may impart a force on the fluid to move it toward an annular outlet 167. A plate 166 may help concentrate the flow of fluid from the cavity 165 to the outlet.

The embodiment of the helical blade 375 shown in FIG. 9A has four loops with a uniform pitch. Alternative embodiments may have one or more blades with more or fewer loops. Blades 375 in such alternative embodiments may have a uniform or variable pitch. Likewise the groove 370 may have a uniform or variable pitch. Alternative embodiments may neither comprise a blade 375 and/or a groove 370.

Turing to FIGS. 10A and 11A, an alternative embodiment of a spinner wheel 150 is shown. A wheel may comprise a hub 168 and a blade 375 positioned within a shell 170. The shell 170 may comprise an outer surface 1705 and an end 175. In some embodiments, the end 175 of the shell 170 may form a unitary part of the shell 170. In alternative embodiments, the end 175 may be a separate component (see FIG. 12). Bores 1757 in the end 175 may align with bores 1685 in the hub 168 (see also FIG. 10B), and the end 175 may be coupled to the hub 168 by fasteners (not shown). In addition, the end 175 of the shell 170 may have a counter-bore 1755 (see FIG. 10C) sized to couple with the end 1686 (see FIG. 10C) of hub 168. A helical blade 375 may be positioned around the hub 168. In addition or alternatively, the wheel 150 may comprise a cage 160 (see FIGS. 7-9).

Turning to FIG. 10C, a cavity 165 may be defined by the end 175, the inner surface 171 of the shell 170, and an outer surface of the hub 168. The hub 168 may have a plurality of inlet apertures 1682 and outlet apertures 1687 in fluid communication with the cavity 165.

In preferred embodiments, the outer diameter of the blade 375 is in contact with the inner surface 171 of the shell 170, and the blade 375 comprises a material suitable (such as stainless steel) for conducting heat from the shell 170. In this manner, the blade 375 may act as a heat sink for the shell 170. The surface area of the blade 375 that is exposed to the coolant is preferably significantly greater than the surface area of the inner surface 171 of the shell 170.

In some embodiments, the blade 375 may be fixedly attached to the inner surface 171 of the shell 170 by welding or other coupling means. In addition or alternatively, the inner diameter of the blade 375 may be approximately sized to the outer diameter of the hub 168 such that fluid flowing from the inlet aperture 1682 must travel through the helical blade 375 to reach the outlet aperture 1687. In alternative embodiments, a gap (not shown), allowing fluid to flow around the blade 375, may be between either the inner diameter of the blade 375 and the outer diameter of the hub 168 and/or the outer diameter of the blade 375 and the inner surface 171 of the shell 170. For example, in one embodiment, the blade 375 may be coupled to the inner surface 171 of the shell 170 (or a cage 160) and there may be a gap (not shown) allowing fluid to flow between the inner diameter of the blade 375 and the outer diameter of hub 168. In an alternative embodiment, the blade 375 may be coupled to outer dimeter of the hub 168 and there may be a gap (not shown) allow fluid to flow between the outer diameter of the blade 375 and the inner surface 171 of the shell 170.

Viewing FIG. 10C, in operation, the wheel 150 may rotate in a direction 155 (see FIG. 10A) about a central axis 190, and molten material (not shown) may be applied to the outer surface 1705 of the shell 170. Through conduction, heat from the outer surface 1705 of the shell 170 may move to the inner surface 171 of the shell and, in some embodiments, one or more blades 375 in contact with the inner surface 171. To cool the shell 170, coolant (not shown) may enter the wheel 150 through a central inlet 162. The inlet 162 may be in fluid communication with apertures 1682 in the hub 168. From the inlet 162 and through the aperture 1682, coolant may enter the cavity 165 and travel toward the inner surface 171 of the shell 170. In some embodiments, the coolant must travel through a helical blade 375 to reach outlet apertures 1687 in the hub 168. The outlet apertures 1687 may be in fluid communication with an annular outlet 167, and coolant may travel from the cavity 165 through the apertures 1687 to the outlet 167 to exit the wheel 150.

FIG. 10C shows a helical blade 375 with four loops and a gap 1655 between an end of the blade 375 and the outlet aperture 1687. The blade 375 imparts a force on the fluid in the cavity 165 to move the fluid toward the outlet aperture 1687 and across the gap 1655. Turning to FIG. 11C, a helical blade 375 is shown with eight loops. Viewing FIG. 11C, the end of the blade 375 may be positioned proximate to the outlet aperture 1687 to convey fluid directly into the outlet aperture 1687. Alternative embodiments of one or more blade 375 may have 1-20 loops. Plural blades 375 may be positioned in parallel (i.e., at least partially overlapping—see, e.g., FIG. 2A) and/or serially (e.g., end-to-end).

In some embodiments, the cavity 165 may be partially filled with coolant such that less than 80% or 70% or 60% or 50% or 40% or 30% or 20% or 10% or 5% or 1% of its volume is filled with coolant. In alternative embodiments, the cavity 165 may be substantially fully filled with coolant such that more than 80% or 85% or 90% or 95% or 99% and up to 100% of its volume is filled with coolant. (To maintain fluid communication with the fluid, an outlet aperture 1687 may be designed within a hub 168 to be more or less proximate to the inner surface 171 of the shell 170 than is shown in FIGS. 10-11.)

The blades shown in FIGS. 10A and 11A have a uniform pitch. In addition or alternatively, all or a portion of one or more blades 375 may have a pitch with respect to a central axis 190 (see FIGS. 10C and 11C) such that it has a uniform pitch or a varying pitch. In addition or alternatively, a shell 170 may comprise a groove 370 on or in its inner surface 171 (see e.g., FIG. 9A).

As shown in FIGS. 7-11, inlet apertures 1615, 1645, 1682, which are in fluid communication with an inlet 162, may take many forms. In some embodiments, an inlet aperture 1645, 1682 may be proximate to a first end 172 of the wheel 150 (see FIGS. 9-11). In addition or alternatively, an inlet aperture 1615 may be proximate to a second end 174 of the wheel 150 (see FIGS. 7-8).

Figure 12:
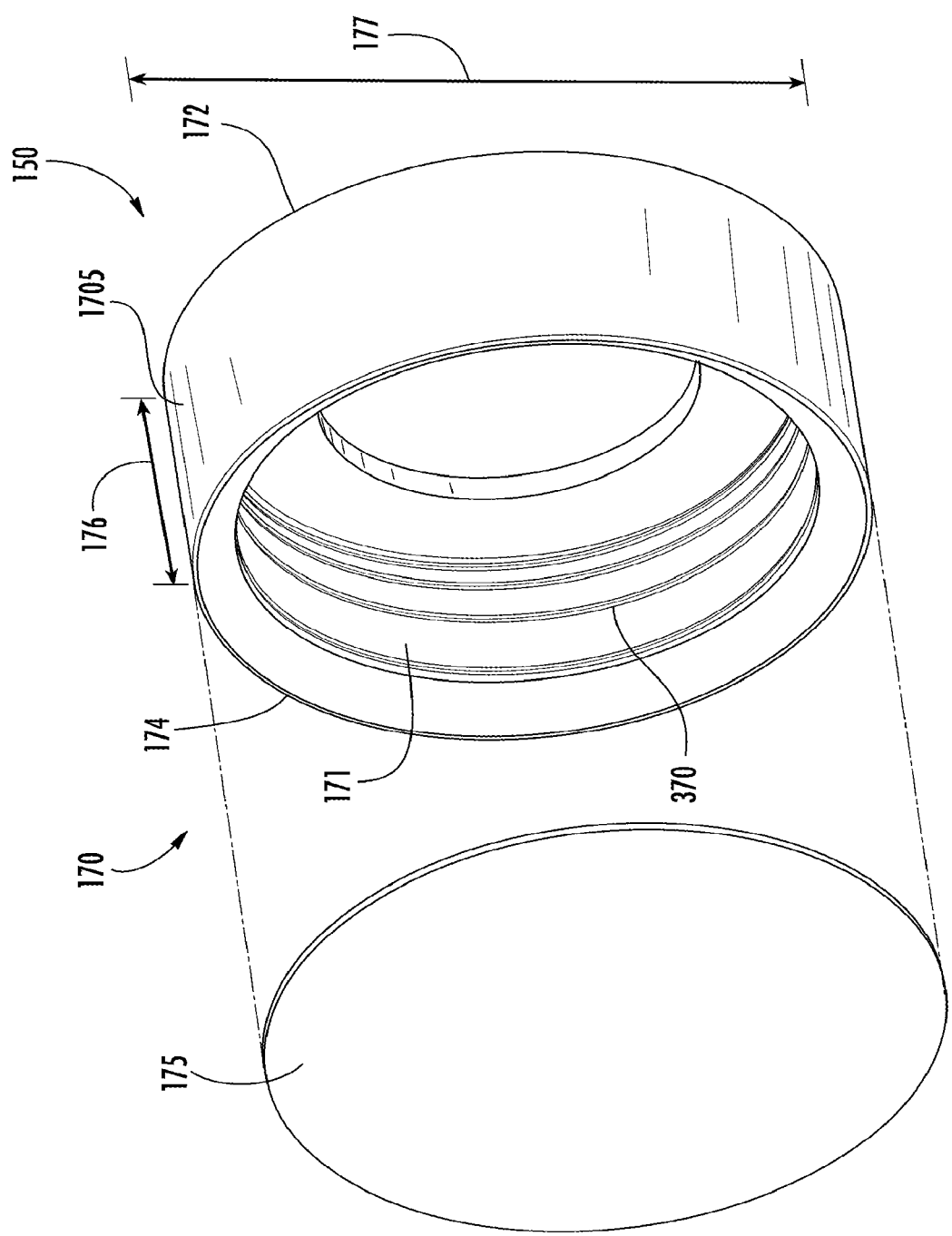
FIG. 12 is an exploded view of a tenth embodiment for a spinner wheel.

Turning to FIG. 12, a wheel 150 may comprise a hollow shell 170 and an endcap 175. An interior of the shell 170, enclosed by cover 175, may be filled with a liquid with a relatively high specific heat, such as water or ethylene glycol. The shell 170 may comprise a first end 172, a second end 174, and a groove 370. The groove 370 may be positioned in or on the inner surface 171 of the shell 170 and move the liquid proximate to the inner surface 171 of the wheel from the first end 172 toward the second end 174. The groove 370 may comprise a fixed, i.e., uniform, or variable pitch spiral shape. FIG. 12 shows a variable pitch helical shape with at least four spiral loops. The groove 370 helps the fluid to circulate within the shell 170, which facilitates cooling and prevents damage to the shell 170. In addition or alternatively, a blade (not shown) may be positioned within the shell 170, including on the inner surface 171.

At least a portion of the circumferential outer surface of wheel 170 may comprise any material suitably resistant to heat damage, such as metal or ceramic. The wheel 170 may further comprise material permitting heat transfer from its outer surface 1705 to its inner surface 171.

In the context of spinner wheels 150, the apparatus and methods described herein provide several significant advantages over an unmodified wheel.

First, for a spinner wheel 150 comprising a groove 370 and/or blade 375 and a cavity 165 that is partially or substantially fully filled with fluid, the groove 370 and/or blade 375 may promote significantly enhanced fluid circulation within the wheel 150.

Second, in addition or alternatively, fluid circulation may be enhanced by forcing fluid to travel from a first end 172 of the wheel 150 to a second end 174 of the wheel 150. For example, as shown in FIGS. 9C, 10C, and 11C, an inlet aperture 1645, 1682 may be positioned proximate to a first end 172 of the wheel 150 and either an outlet 167 and/or outlet aperture 1687 may be positioned proximate to a second end 174 of the wheel 150. In addition or alterna-tively, as shown in FIG. 7E, an inlet aperture 1615 in a hub 161 may inject fluid into the cavity 165 under pressure and direct it to the first end 172 (see arrows pointing from hub 161).

Third, a wheel 150 comprising a siphon 180 may also promote fluid circulation and/or significantly reduce the volume of fluid needed to circulate within the cavity 165.

The first, second, and/or third advantages may apply even if the spinner wheel 150 is not exposed to high temperatures.

Fourth, for a spinner wheel 150 used to spin metal or other molten materials applied to the outer surface 1705 of a shell 170, a groove 370 and/or blade 375 may facilitate heat transfer from the shell 170 to a coolant. For example, the groove 370 may increase the surface area of the inner surface 171 to which the coolant is exposed. In addition or alternatively, the blade 375 may conduct heat from the shell 170, acting as a heat sink.

However, not all embodiments are required to have any or all the foregoing advantages.

EXAMPLES

Numerous industrial applications for the invention are possible. Any designer of a pipe or cylindrical system in which fluid must be moved in an axial direction may benefit from the teachings of this disclosure. Specifically, whether a process requires a rotating cylinder to be heated or cooled, the invention is directly applicable. Typical examples are dryer drums, "Yankee" tissue dryer cylinders, metal spinning drums, mineral wool spinning wheels, textile slashers, corrugator cans, calendar rolls, water tube boiler tubes, and condenser tubs, among others. Some specific examples of the invention are as follows.

Prophetic Example 1

Viewing FIG. 1B, a cylinder 100 in a paper making machine may have a diameter of about 1-5 meters (or any subrange between) or preferably about 1.52 meters and a length of about 5-11 meters (or any subrange between) or preferably about 9 meters. In operation, supply steam pressure may be about 600-1000 kpa (or any subrange between) or preferably 860 kpa with a flow rate of about 7-12 liters per minute (or any subrange between) or preferably about 9.1 liters per minute. At steady state conditions, the cylinder may be rotated at about 90-200 RPM (or any subrange between) or preferably about 127 RPM.

The blade pitch may be optimized according to the operating rotational velocity of the cylinder. Based on the foregoing preferred operating conditions, the first loop proximate to the first end 102 forms a pitch with the central axis 190 that is substantially perpendicular. The second pitch 1310 (approximately 83 degrees) and successive pitches 1312 (approximately 72 degrees), 1314 (approximately 58 degrees), 1316 (approximately 35 degrees), 1318 (approximately 14 degrees) have progressively smaller slopes until the end of the blade 300 is substantially perpendicular with the central axis 190. Accordingly, the distance 1320 (approximately 15 cm) between the first spiral and the second spiral may be less than the distance 1322 (approximately 25 cm) between the second and third spirals, which is less than the distance 1324 (approximately 64 cm) between the third and fourth spirals. Likewise, the distance 1326 (approximately 209 cm) between the fourth and fifth spirals may be greater than the distance 1324 but less than the distance 1328 (approximately 323 cm) between the fifth and sixth spirals.

The velocity of the condensate within the cylinder 100 accelerates along the longitudinal axis of the cylinder 100. For condensate contacting the first loop proximate to the first end 102 of the cylinder 100, the velocity is almost zero while condensate proximate to the second end 104 is approximately 1.1 m/s. In some siphon configurations, this may allow the condensate to be evacuated through a rotating siphon with little or no blow through steam.

Prophetic Example 2

Cylinder 100 in a paper making machine may have a diameter of about 1.52 meters and a length of about 9 meters. In operation, supply steam pressure may be 860 kpa with a flow rate of 9.1 liters per minute. At steady state conditions, the cylinder may be rotated at 96 RPM. The velocity of the condensate within the cylinder 100 accelerates along the longitudinal axis of the cylinder 100. For condensate contacting the first loop proximate to the first end 102 of the cylinder 100, the velocity is almost zero. In this example, condensate proximate to the second end 104 is approximately 0.78 m/s. In some siphon configurations, this may allow the condensate to be evacuated through a rotating siphon with less than about 10% blow through steam.

Prophetic Example 3

Viewing FIG. 12, a wheel 150 comprising a shell 170 may rotate at about 4,000-7,000 RPM (or any subrange between) or preferably about 5,000 RPM. A length 176 of the shell may be about 20-50 cm (or any subrange between) or preferably about 32 cm and the diameter 177 may be about 30-70 cm (or any subrange between) or preferably about 56 cm. Water may circulate within the wheel at about 20-60 liters per minute (or any subrange between) or preferably about 40 liters per minute.

Prophetic Example 4

Viewing FIG. 7E, a wheel 150 comprising a shell 170 may rotate at about 4,000-7,000 RPM (or any subrange between) or preferably about 5,000 RPM. A length 176 of the shell may be about 20-50 cm (or any subrange between) or preferably about 32 cm and the diameter 177 may be about 30-70 cm (or any subrange between) or preferably about 56 cm. Ethylene glycol may circulate as a coolant within the wheel at about 10-60 liters per minute (or any subrange between) or preferably about 48 liters per minute. Coolant flow into the wheel 150 may be regulated to maintain coolant levels approximately at the level of the mouth 185 of the siphon 180 (see FIG. 7F). The coolant may be introduced via inlet 162 under a pressure of about 300-600 kpa (or any subrange between) or preferably about 425 kpa.

In conclusion, the embodiments and examples shown in the drawings and described above are exemplary of numerous others that may be made within the scope of the appended claims. It is contemplated that numerous other configurations may be used, and the material of each component may be selected from numerous materials other than those specifically disclosed.

In conclusion, in the interest of clarity, not all features of an actual implementation—e.g., dimensions, tolerances, etc.—are described in this disclosure. As used in this disclosure, the terms "about," "approximately," and "substantially" apply to all numeric values, whether or not explicitly indicated. These terms generally refer to a range of numbers that one of skill in the art would consider equivalent to the recited values (i.e., having the same function or result). In other words, such words of approximation refer to a condition or measurement that would be understood to not necessarily be absolute or perfect but considered close enough by those of ordinary skill in the art to warrant designating the condition as being present or the measurement being satisfied. For example, a numerical value or measurement modified by a word of approximation may vary from the stated value by 1, 2, 3, 4, 5, 6, 7, 10, 12, and up to 15%.

It will be appreciated that, in the development of a product or method embodying the invention, the developer must make numerous implementation-specific decisions to achieve the developer's specific goals, such as compliance with manufacturing and business-related constraints, that will vary from one implementation to another. Moreover, it will be appreciated that such a development effort may be complex and time-consuming, but would nevertheless be a routine undertaking for those of ordinary skill in the art having the benefit of this disclosure.

No special definition of a term or phrase, i.e., a definition that is different from the ordinary and customary meaning as understood by those skilled in the art, is intended to be implied by consistent usage of the term or phrase herein. The words and phrases used herein should be understood and interpreted to have a meaning consistent with the understanding of those words and phrases by those skilled in the relevant art. For example, an embodiment comprising a singular element does not disclaim plural embodiments; i.e., the indefinite articles "a" and "an" carry either a singular or plural meaning and a later reference to the same element reflects the same potential plurality. A structural element that is embodied by a single component or unitary structure may be composed of multiple components. Ordinal designations (first, second, third, etc.) merely serve as a shorthand reference for different components and do not denote any sequential, spatial, or positional relationship between them.

The foregoing description of the embodiments of the invention has been presented for purposes of illustration and description. It is not intended to be exhaustive or to limit the invention to the precise form(s) disclosed, and modifications, and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined only by the following claims, as amended, and their equivalents.

DESCRIPTION OF REFERENCED NUMERALS 100 cylinder
101 inner surface
102 first end of cylinder 100
104 second end of cylinder 100
110 support member
120 shaft
124 condensate outlet
150 spinner wheel
151 motor
152 belt
153 shaft
154 journal
1545 bore
155 direction of rotation
158 coolant exchanger 160 cage
1605 apertures in cage 160
1608 bore
161 hub
1615 aperture for inlet 162
162 inlet
164 shaft
1645 aperture for inlet 162
165 cavity
1655 gap
166 outlet plate
1665 inlet plate
167 outlet
168 hub
1682 aperture for inlet 162
1685 bore
1686 end of hub 168
1687 aperture for outlet 167
169 fastener
170 shell
1705 outer surface of shell 170
171 inner surface of shell 170
172 first end
174 second end
175 outer wheel endcap
1751 inner wheel endcap
1752 flange
1753 notch
1755 counter bore
1756 bore
1757 bore
176 wheel length
177 wheel diameter
180 siphon
181 bushing
182 distal end of siphon 180
184 shoe
1845 skirt
185 mouth
186 scoop
190 central axis
200 rotary siphon
300 variable pitch blade
301 second variable pitch blade
305 uniform pitch blade
310 first blade segment
311 second blade segment
312 third blade segment
320 blade width
322 blade height
324 blade pitch
370 groove for moving liquid
375 helical blade
500 fluid or condensate
1310-1318 pitch with respect to longitudinal axis 190
1320-1328 distances between loops of blade 300
2320-2336 distances between loops of blades 300 and 301
3310-3316 ~45 degree pitch for blade 300
3320-3326 distances between loops of blade 300

What is claimed is:
1. A wheel for making mineral wool or metal wool, the wheel comprising:
   a. a hollow, cylindrical shell having an outer surface, an annular inner surface, an inner diameter, and a first end and a second end; wherein the shell is rotatable about a central axis; wherein the outer surface is configured to receive molten material for making mineral wool or metal wool;
   b. a cavity within the hollow shell defined at least by the inner surface of the shell;
   c. an inlet and an outlet in fluid communication with the cavity; wherein the inlet and the outlet are each proximate to the second end of the shell;
   d. a central member comprising a plurality of inlet apertures in fluid communication between the inlet and the cavity, wherein the plurality of inlet apertures are proximate to the first end of the shell;
   e. a helical blade disposed within the cavity around the central member; wherein at least a portion of the blade is positioned along the central axis between the plurality of inlet apertures and the outlet for imparting a force on a fluid in the cavity to move the fluid toward the outlet.

2. The wheel of claim 1, wherein the central member includes a hub; wherein the plurality of inlet apertures are in the hub; and wherein the hub further includes an outlet aperture in fluid communication between the cavity and the outlet.

3. The wheel of claim 1, wherein the helical blade has a uniform pitch relative to the central axis.

4. The wheel of claim 1, wherein the helical blade has a varying pitch relative to the central axis.

5. The wheel of claim 1, wherein the inner surface has at least one helical groove with a uniform pitch relative to the central axis.

6. The wheel of claim 1, wherein the inner surface has at least one helical groove with a varying pitch relative to the central axis.

7. The wheel of claim 1, further comprising:
   a. an annular cage coupled to the first end and second end of the shell, the cage having an inner diameter;
   b. wherein the helical blade is disposed within the cage; and
   c. an outer diameter of the helical blade is less than the inner diameter of the cage.

8. The wheel of claim 1, wherein an outer diameter of the helical blade is less than the inner diameter of the shell; and the helical blade is rotatable about the central axis.

9. The wheel of claim 1, wherein an outer diameter of the helical blade is less than the inner diameter of the shell; and the helical blade has a stationary position relative to the rotatable wheel.

10. The wheel of claim 1, wherein the shell has an outer diameter of between about 30-70 cm and a length of between about 20-50 cm.

11. A spinner wheel drive system comprising the wheel of claim 1 and a motor powering a shaft; wherein the shaft applies a torque to the wheel.

12. The wheel of claim 1, wherein at least a portion of the helical blade is coupled to the inner surface of the shell such that the helical blade rotates with the shell.

13. The wheel of claim 12, further comprising a stationary siphon.

14. The wheel of claim 13, wherein a shoe is coupled to the siphon.

15. The wheel of claim 13, wherein a scoop is coupled to the siphon.

16. The wheel of claim 12, further comprising an annular cage coupled to the first end and second end of the shell, the cage having an inner diameter and an outer diameter.

17. The wheel of claim 16, wherein the inner diameter of the helical blade is greater than the outer diameter of the cage.

18. The wheel of claim 16, further comprising a siphon and wherein an end of the siphon is positioned within the inner diameter of the cage.

\* \* \* \* \*